United States Patent
Ansari et al.

(10) Patent No.: US 8,351,786 B2
(45) Date of Patent: Jan. 8, 2013

(54) MAXIMIZING CAPACITY OF WAVELENGTH DIVISION MULTIPLEXING PASSIVE OPTICAL NETWORKS

(75) Inventors: Nirwan Ansari, Montville, NJ (US); Jingjing Zhang, Kearny, NJ (US)

(73) Assignee: New Jersey Institute of Technology, Newark, NJ (US)

(*) Notice: Subject to any disclaimer, the term of this patent is extended or adjusted under 35 U.S.C. 154(b) by 185 days.

(21) Appl. No.: 12/723,578

(22) Filed: Mar. 12, 2010

(65) Prior Publication Data

US 2010/0232790 A1 Sep. 16, 2010

Related U.S. Application Data

(60) Provisional application No. 61/160,072, filed on Mar. 13, 2009.

(51) Int. Cl.
*H04B 10/20* (2006.01)
*H04J 14/00* (2006.01)

(52) U.S. Cl. .............................. 398/58; 398/68; 398/70

(58) Field of Classification Search .................. 398/66, 398/67, 58, 68, 70–72, 74
See application file for complete search history.

(56) References Cited

U.S. PATENT DOCUMENTS

| | | | | |
|---|---|---|---|---|
| 6,411,410 | B1 * | 6/2002 | Wright et al. | 398/79 |
| 7,962,038 | B2 * | 6/2011 | Chen | 398/69 |
| 2003/0061017 | A1 * | 3/2003 | Dotaro et al. | 703/14 |
| 2005/0069314 | A1 | 3/2005 | De Patre et al. | |
| 2007/0116468 | A1 * | 5/2007 | Ji et al. | 398/79 |
| 2010/0111523 | A1 * | 5/2010 | Hirth et al. | 398/25 |

OTHER PUBLICATIONS

International Search Report and Written Opinion received for PCT Application PCT/US10/027259, mailed Jun. 22, 2010.
L. Hutcheson, "FTTx: Current Status and the Future," IEEE Communications Magazine, vol. 46, No. 7, pp. 90-95, Jul. 2008.
C. H. Lee et al, "WDMPON Experiences in Korea," Journal of Optical Networking, vol. 6, No. 5, pp. 451-464, 2007.
A. Banerjee et al, "Wavelength Division-Multiplexed Passive Optical Network (WDM-PON) Technologies for Broadband Access: A Review," Journal of Optical Networking, vol. 4, No. 11, pp. 737-758, 2005.
F. Effenberger et al, "An introduction to PON technologies," IEEE Communications Magazine, vol. 45, No. 3, pp. S17-S25, Mar. 2007.
K. Grobe et al, "PON in adolescence: from TDMA to WDMPON," IEEE Communications Magazine, vol. 46, No. 1, pp. 26-34, Jan. 2008.
Y. Luo et al, "Bandwidth allocation for multiservice access on EPONs," IEEE Communications Magazine, vol. 43, No. 2, pp. S16-S21, Feb. 2005.

(Continued)

*Primary Examiner* — Dalzid Singh
(74) *Attorney, Agent, or Firm* — Turk IP Law, LLC

(57) ABSTRACT

Technologies are generally described for substantially maximizing capacity in a wavelength division multiplexing (WDM) passive optical network (PON). An "achievable rate region" may be defined as a set containing admissible traffic rates of a given WDM PON system such that a volume of an achievable rate region is proportional to a capacity of the network. Deriving the achievable rate region for a particular network, decisions may be made whether incoming traffic rate can or cannot be achieved for that network. Moreover, the achievable rate region may be used to construct a WDM PON utilizing a minimum number of wavelengths, a minimum number of lasers with narrowest tuning ranges, and a minimum number of receivers, thereby reducing a capital expenditure in building the PON system.

24 Claims, 12 Drawing Sheets

OTHER PUBLICATIONS

H. D. Kim et al, "A low-cost WDM source with an ASE injected fabry-perot semiconductor laser," IEEE Photonics Technology Letters, vol. 12, No. 8, pp. 1067-1069, Aug. 2000.

J. S. Baik et al, "Hybrid WDM/SDMA-PON using wavelength-locked fabry-perot laser diodes," IEEE Photonics Technology Letters, vol. 18, No. 15, pp. 1585-1587, Aug. 2006.

G. Maier et al, "Design and cost performance of the multistage WDM-PON access networks," IEEE/OSA Journal of Lightwave Technology, vol. 18, No. 2, pp. 125-143, Feb. 2000.

N. Frigo et al, "A wavelength-division multiplexed passive optical network with cost-shared components," Photonics Technology Letters, IEEE, vol. 6, No. 11, pp. 1365-1367, Nov. 1994.

P. Healey et al, "Spectral slicing WDM-PON using wavelength-seeded reflective SOAs," Electronics Letters, vol. 37, No. 19, pp. 1181-1182, Sep. 2001.

W. Lee et al, "Bidirectional WDM-PON based on gain-saturated reflective semiconductor optical amplifiers," IEEE Photonics Technology Letters, vol. 17, No. 11, pp. 2460-2462, Nov. 2005.

J.M. Kang et al, "A novel hybrid WDM/SCM-PON sharing wavelength for up- and down-link using reflective semiconductor optical amplifier," IEEE Photonics Technology Letters, vol. 18, No. 3, pp. 502-504, 1, 2006.

L. Coldren et al, "Tunable semiconductor lasers: a tutorial," IEEE/OSA Journal of Lightwave Technology, vol. 22, No. 1, pp. 193-202, Jan. 2004.

J. Buus et al, "Tunable lasers in optical networks," IEEE/OSA Journal of Lightwave Technology, vol. 24, No. 1, p. 5, 2006.

J. Halpern et al, "Fiber: revolutionizing the Bell's telecom networks," Bernstein Telcordia Technologies Study, May 2004.

C.H. Lee et al, "Fiber to the home using a PON infrastructure," Journal of Lightwave Technology, vol. 24, No. 12, pp. 4568-4583, 2006.

Anshelevich, E., & Zhang, L., "Path Decomposition under a New Cost Measure with Applications to Optical Network Design," ACM Transactions on Algorithms (TALG), Mar. 2008, vol. 4, Issue: 1, Article 15, pp. 20.

Part 3: Carrier Sense Multiple Access with Collision Detection(CSMA/CD) Access Method and Physical Layer Specifications Amendment 1: Physical Layer Specifications and Management Parameters for 10 Gb/S Passive Optical Networks; IEEE Computer Society, Sponsored by the LAN/MAN Standards Committee; Oct. 30, 2009, 236 pages.

"Full-Service Access Network (FSAN)," accessed at http://www.fsan-web.org, copyright 2012.

Hajduczenia, M., et al., "Optimized passive optical network deployment," Journal of Optical Networking, (2007), vol. 6, Issue: 9, pp. 1079-1104.

ITU-T G.695. Series G: Transmission Systems and Media, Digital Systems and Networks. Transmission media characteristics—Characteristics of optical components and subsystems: Optical Interfaces for coarse wavelength division multiplexing applications, Geneva (Switzerland), 2004.

Khan, S.U., and Ahmed, M., "A Bottleneck Eliminating Approximate Algorithm for PON Layout," Proceedings of the International Conference on Information Technology 2007, pp. 1089-1094.

McConville, R., "Tellabs Lays Out WDM-PON Plan," accessed at http://www.lightreading.com/document.asp? doc_id=156602&site=nxtcomm, Jun. 17, 2008, pp. 5.

Office Action for international application serial No. 11 2010 001 305.5 (English Translation) mailed Sep. 20, 2012.

* cited by examiner

US 8,351,786 B2

MAXIMIZING CAPACITY OF WAVELENGTH DIVISION MULTIPLEXING PASSIVE OPTICAL NETWORKS

CROSS REFERENCE TO RELATED APPLICATIONS

This application claims the benefit of U.S. Provisional Patent Application Ser. No. 61/160,072 filed on Mar. 13, 2009. The disclosures of the provisional patent application are hereby incorporated by reference for all purposes.

BACKGROUND

Unless otherwise indicated herein, the materials described in this section are not prior art to the claims in this application and are not admitted to be prior art by inclusion in this section.

Wavelength Division Multiplexing (WDM) Passive Optical Network (PON) is a recently developed network technology for meeting the rapidly increasing traffic demands caused by the popularization of Internet and spouting of bandwidth-demanding applications. The inherent high cost of multi-wavelength provision may hinder the deployment of WDM PON. As compared to Time Division Multiplexing (TDM) PON, WDM PON may be associated with additional capital expenditure in enabling remote nodes, transmitters, and receivers with multi-wavelength provision capability. The multi-wavelength provision is one parameter in determining the capacity of WDM PON architecture. Specifically, the capacity of a PON system may depend on the network architecture, wavelength supporting capability of optical devices, as well as data rate of the source generators and receivers.

The present disclosure appreciates that there are several limitations with designing WDM PONs. For example, there are three major classes of optical source generators, depending on the wavelengths generation capability, i.e., wavelength-specified sources, wavelength-tunable sources, and multi-wavelength sources. These three classes of optical sources may each have different wavelength supporting ability and different costs. Moreover, service providers may desire to determine, prior to deployment, capacity and cost comparisons in order to maximize their capital investment returns.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
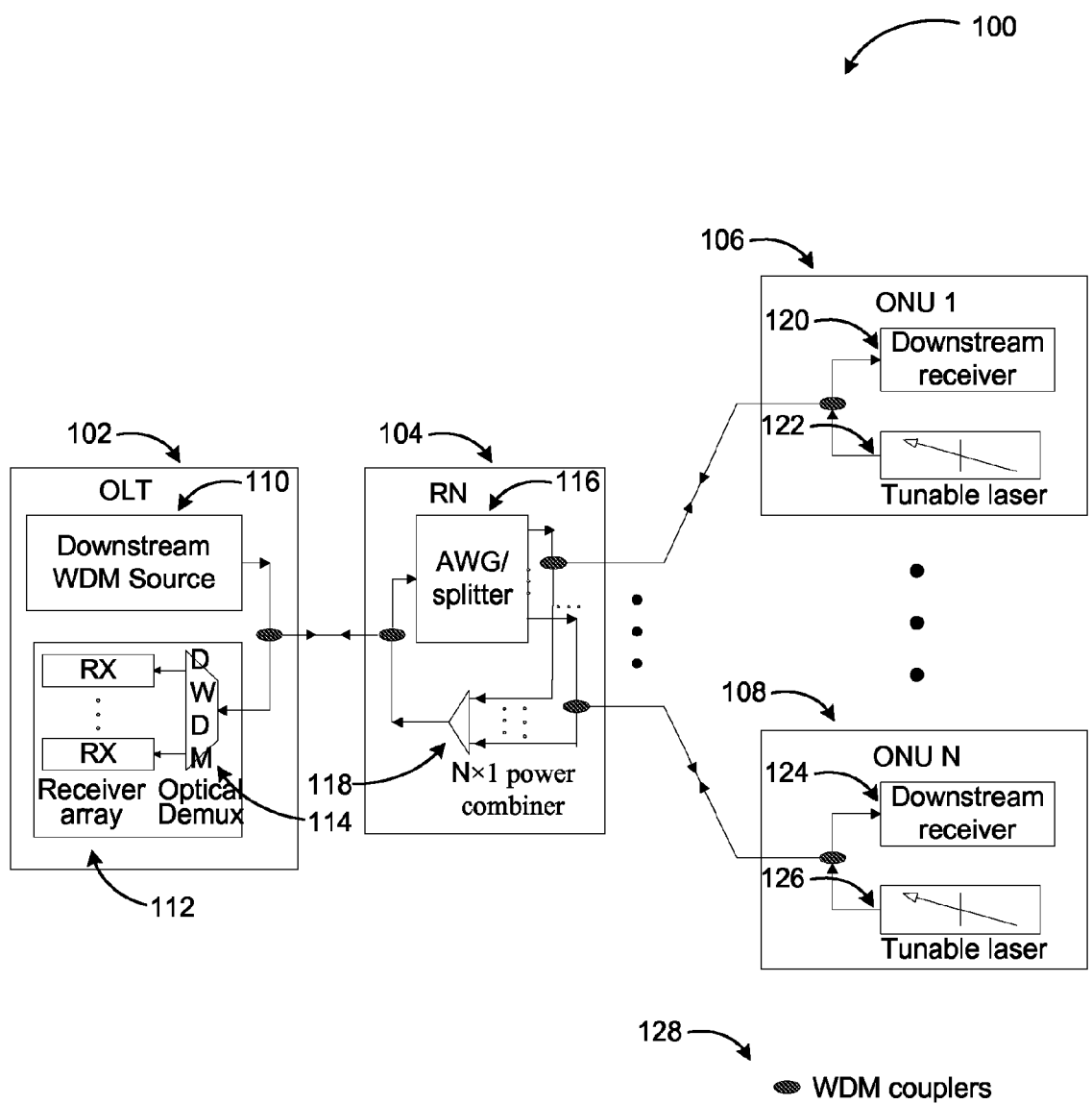
FIG. 1 illustrates an example WDM PON architecture, where a capacity may be substantially maximized.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to maximization of capacity in WDM PONs.

Briefly stated, an "achievable rate region" may be defined as a set containing admissible traffic rates of a given WDM PON system. Deriving the achievable rate region for a particular network, decisions may be made whether incoming traffic rate can or cannot be achieved for that network. Moreover, the achievable rate region may be used to construct a WDM PON utilizing a minimum number of wavelengths, a minimum number of lasers with narrowest tuning ranges, and a minimum number of receivers, thereby reducing a capital expenditure in building the PON system.

FIG. 1 illustrates an example of WDM PON architecture, where a capacity may be substantially maximized according to at least some embodiments described herein. To provision multiple wavelengths for upstream transmission, a WDM PON may be realized in two major classes of architectures, depending on the placement of optical light generators. The first class is to equip optical network units (ONUs) with lasers for their own upstream traffic transmission. The lasers may be placed at the ONU side. The second class may utilize lasers at the optical line terminal (OLT) side to supply seed light for upstream transmission. The unmodulated light supplied by OLT may be first transmitted down to ONUs and then modulated and reflected back by ONUs. Instead of lasers, reflective receivers and modulators may be equipped at ONUs to realize colorless ONUs. The reflective modulator may be based on reflective semiconductor optical amplifier (RSOA) combined with an electro-absorption modulator. Since the signal and seed lights are transmitted in opposite directions on the same wavelength, this type of network may need to consider the effect of optical reflection, including Rayleigh backscattering, which may limit maximum network reach and largest channel bit rate. A network architecture according to the first class may be simpler, more reliable, and potentially able to achieve a higher loss budget and larger bit rates.

As mentioned previously, there are three major classes of optical source generators depending on the wavelengths generation capability, namely, wavelength-specific sources, wavelength-tunable sources, and multi-wavelength sources. A wavelength-specific source may emit one specific wavelength, e.g., the common distributed feedback (DFB) laser diode (LD), distributed Bragg reflector (DBR) LD, or the vertical-cavity surface-emitting LD. A multiple-wavelength source may be able to generate multiple WDM wavelengths simultaneously, including multi-frequency laser, gain-coupled DFB LD array, or chirped-pulse WDM. Beside multi-wavelength sources, a wavelength-tunable source may generate multiple wavelengths as well. However, the wavelength-tunable source can typically generate one wavelength at a time. Tunable lasers may employ many technologies such as DFB array, sampled grating DBR, external cavity diode laser etalon, etc. Different technologies may yield different tuning ranges.

From a media access (MAC) layer's point of view, in the case of wavelength-specific lasers, one wavelength channel is utilized by a fixed set of lasers, and thus the statistical multiplexing gain cannot be exploited for traffic from lasers using different wavelength channels. In the case of wavelength-tunable lasers, the wavelength tunability may facilitate statistical multiplexing of traffic from a larger set of lasers, thus potentially enhancing system performance. Tunable lasers also provide simpler inventory management and reduced spare parts costs for network operators.

According to some implementations, one wavelength may be shared by more than one ONU (106, 108) in a time division multiplexing (TDM) fashion as shown in diagram 100. The hybrid WDM/TDM property of the upstream transmission makes it possible to exploit statistical gain among traffic from different ONUs. In the upstream transmission, tunable lasers (122, 124) at ONUs may be configured to first send out the modulated signal to a remote node (RN) 104. The RN may include a wavelength-insensitive power combiner 118 that is configured to multiplex the upstream signal from ONUs onto the fiber connected to an OLT 102. The signal, which is multiplexed in both the time and wavelength domains, may then be transmitted by the RN 104 to the OLT 102. The OLT 102 may include a wavelength demultiplexer 114 and a receiver array 112 configured to receive the upstream signal. Alternatively, the OLT 102 may also include a downstream WDM source 110 that is configured to send transmissions downstream to downstream receivers 120 and 124 through a splitter 116 at the RN 104. WDM couplers 128 provide coupling for the light transmission path between different components of the system.

Different tuning ranges of tunable lasers may lead to different traffic statistical gain, hence resulting in different admissible traffic. The broader the tuning ranges of lasers are, the higher statistical gain may be exploited, and the more traffic may be admitted to the network. However, lasers with broader tuning ranges may require more sophisticated technology and thus may incur higher cost than those with narrower tuning ranges. Thus, an optimal trade-off between tuning ranges of lasers and the admissible traffic of the network may need to be reached. This is equivalent to selecting lasers with tuning ranges as narrow as possible in order to admit the maximum traffic or a given upstream traffic. Likely scenarios in determining a trade-off may include: (1) Assuming full-range tunable lasers that enable the network to admit the largest amount of traffic are available, the number of full-range tunable lasers in the network may be decreased to reduce the cost of lasers while admitting the same amount of traffic. (2) Assuming limited-range tunable lasers with different tuning ranges are available and each ONU can select a laser with any available tuning range, lasers may be selected to enable the network to admit as much traffic as possible or admit given upstream traffic. (3) Given an exact number of lasers with specific tuning ranges, these lasers may be assigned to ONUs to admit given upstream traffic.

Returning to diagram 100, each ONU (106, 108) may be equipped with a tunable laser (122, 126) that is adapted for use in upstream data transmissions. Each laser (122, 126) may be tuned to a particular set of wavelengths. The sets of wavelengths tuned by different lasers may include the same particular set of wavelengths, overlapping sets of wavelengths, or disjointed sets of wavelengths. Some particular wavelengths may be shared by more than one ONU so that the statistical gain among traffic of ONUs that share wavelengths may be exploited.

The upstream-modulated signals may first be transmitted from ONUs (106, 108) by tunable lasers to RN 104. After RN 104 receives the upstream signal, RN 104 may use WDM couplers 128 to separate the upstream signal from the downstream signal and then may employ wavelength-insensitive power combiner 118 to multiplex the upstream signal from the total of ONUs onto the fiber connected to OLT 102. The output signal of the power combiner 118 may be multiplexed in both the time and wavelength domains. RN 104 may then transmit the multiplexed signal to OLT 102. OLT 102 may employ wavelength demultiplexer 114 and a receiver array 112 to receive the upstream signal. In some examples, both the number of output ports of the demultiplexer 114 and the number of receivers may be equal to the total number of wavelengths used in the network. As shown in diagram 100, an example upstream transmission link may consist of four WDM couplers 128, a power combiner 118, a dense WDM demultiplexer 114, and optical fibers. The ONUs, OLTs, RN, and WDM couplers may be considered nodes of the network.

At least two characteristics of this network architecture are noteworthy. First, each ONU may be equipped with a tunable laser adapted for use in upstream transmissions. The tunable lasers' flexible wavelength provisioning may be exploited to improve the system performance. Second, the upstream and downstream signals may be separated by WDM couplers at the RN, and then routed differently within the RN so that the upstream and downstream wavelength assignment problems may be addressed individually. A power combiner/splitter may multiplex the upstream signals with low insertion loss. Due to the wavelength-insensitive property of power combiner/splitter, the upstream wavelength assignment may not need to consider the wavelength routing capability of the RN. To achieve a higher downstream power budget, the RN may be adapted to utilize wavelength-selective devices with low insertion loss, such as arrayed waveguide gratings to distribute downstream signal. Hence, separating upstream signals from downstream signals at the RN may add more flexibility in addressing the upstream wavelength assignment problem.

Figure 2:
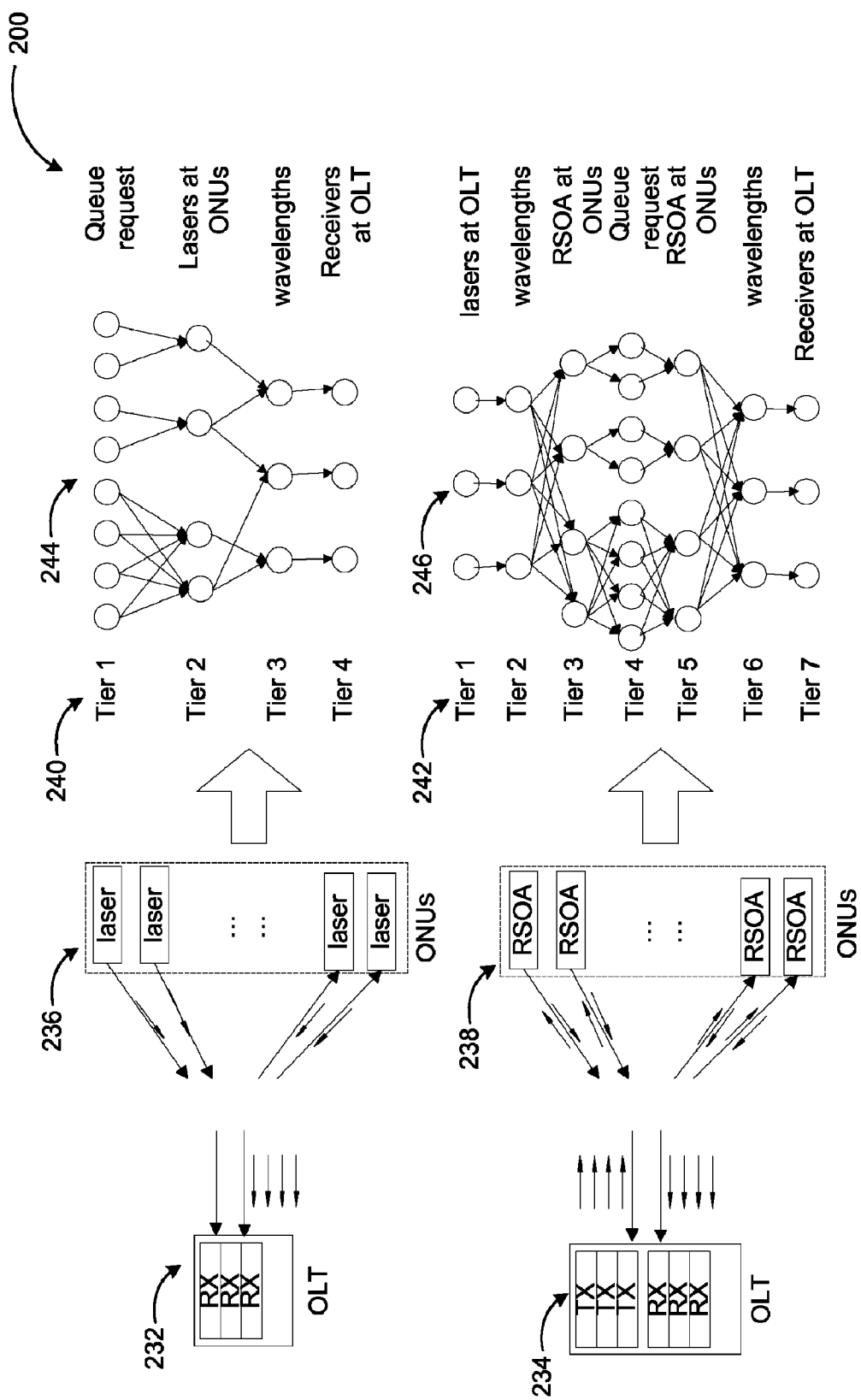
FIG. 2 illustrates an example graph abstraction of the data transmission process in a WDM PON.

FIG. 2 illustrates an example graph abstraction of the data transmission process in a WDM PON that is arranged in accordance with at least some examples described herein. Diagram 200 illustrates graph abstraction according to the two classes of architectures discussed above in conjunction with FIG. 1, according to which upstream data transmission may be accomplished depending on the placement of source generators for upstream transmission.

The first class shown in the upper portion of diagram 200 equips each ONU (236) with lasers configured for upstream traffic transmission with OLTs 232 having receivers (RX) only. In this architecture, ONUs 236 may be configured to use either wavelength-fixed lasers or wavelength-tunable lasers for upstream data transmission.

In contrast with the first class, the architecture shown in the lower part of diagram 200 does not equip ONUs 238 with lasers for upstream data transmission, but let ONUs 238 share light sources at the OLT side (TX modules of OLT 234). An unmodulated signal supplied by lasers at the OLT 234 may first be transmitted down to ONUs 238, and then modulated and reflected back by ONUs 238 using RSOA technology. Placing lasers at OLT 234 may enable the sharing of cost-intensive upstream source generators. Therefore, as compared to the first architecture, the second architecture may reduce a total cost associated with the lasers.

In both of the described architectures, the light signals for upstream data transmission may undergo similar processes: signals may first be generated by lasers in the ONUs or OLTs, then modulated on certain wavelengths using modulators, then received by certain receivers in the Onus or OLTs, and so on. The process of upstream transmission may be abstracted by virtue of directed graphs, where the direction in the graph identifies the transmission direction of the light signal.

To describe the process, the abstracted graph 244 for the first architecture consists of four tiers 240 of vertices, corresponding to queue requests at ONUs, lasers at ONUs, wavelengths, and receivers at OLT, respectively. In an example upstream data transmission process, queue requests may be utilized by the ONUs to select appropriate lasers to generate the light signals to carry the data signals. The selected lasers may be configured to select proper wavelengths so that signals in the proper wavelengths may be received by the receivers in the OLTs after the upstream signals arrive at the OLT.

As depicted in abstracted graph 244, vertices in one tier connect to vertices in the neighboring tiers. The sub-graph constituted by vertices in one tier and vertices in the neighboring tier is referred to as a bipartite graph. The construction of the connecting edges is described in three or more steps as follows below. In a first step, a tier-one vertex may connect to a tier-two vertex if the corresponding queue request in the first tier can access that corresponding laser in the second tier. Typically, an ONU may have multiple queue requests which can access the lasers equipped at the ONU. So, the bipartite sub-graph constituted by queue requests and lasers in the same ONU is fully connected. In a second step, a tier-two vertex may connect to a tier-three vertex if the corresponding laser in the second tier can be tuned to that corresponding wavelength in the third tier. These edges may be determined by the laser's tuning ability. If all the lasers are full-range tunable, the bipartite graph is fully-connected. In a third step, a tier-three vertex may connect to a tier-four vertex if the wavelength in the third tier can be received by the receiver in the fourth tier. The edges connecting vertices in the two tiers may depend on the receiver's receiving range. Usually, the receivers may be wavelength-insensitive, implying that the sub-graph constituted by the tier-three vertices and the tier-four vertices are fully connected.

At each time, a queue request may be scheduled for a laser; a laser may be tuned to a wavelength; a wavelength may be tuned by a laser, and a receiver may be configured to receive signals in one wavelength. For a time slotted system, the upstream traffic transmission in an individual time slot may be considered as a four-tuple matching problem in the four-tier graph.

Similar to the first architecture, upstream transmission in the second architecture (lower portion of the diagram 100) may be abstracted as a tiered graph 246 based on the light transmission process as well. The first four tiers (242) illustrate the process that OLT may supply light sources, and ONUs may receive and reflect the light back by using RSOA; the last four tiers (242) illustrate the process that ONUs may modulate and reflect back the light signal by RSOA, and OLT may receive the light signal. Since ONUs do not change the wavelength of the light signal according to this architecture, the reflected light path in the latter four tiers may usually be reverse of that in the first four tiers. Once the tiered graphs are abstracted, the graphs themselves may be analyzed by a processor or computing device executing an analysis and/or configuration application to determine network performance.

With respect to the second architecture, the first four tiers correspond to the process that OLT supplies light sources, and ONUs receive and reflect the transmitted light back by using RSOA; the last four tiers correspond to the process that ONUs modulate and reflect back the light signal by RSOA, and OLT receives the light signal, as mentioned above. The characteristics of the tiered graph may be described as follows.

Since one queue request may access any RSOA in the same ONU, the bipartite graph constituted by vertices in tier 3 and tier 4 of the same ONU may be fully connected. To build a WDM PON system, the number of RSOAs in an ONU may need to be large enough to guarantee the total rate in the ONU. Because RSOA is wavelength-insensitive, the bipartite graph constituted by vertices in tier 2 and tier 3 may also be fully connected. The number of wavelengths may have to guarantee the total rate in the PON system.

It may not be necessary to increase the number of lasers in tier one beyond the number of wavelengths. Since the number of wavelengths is usually less than the number of ONUs, the second architecture may be equipped with less number of lasers as compared to that of the first architecture, where each ONU may be equipped with at least one laser. On the other hand, the number of lasers may have to guarantee the total rate of the system. The lemmas and theorems discussed herein may be applied to reduce the laser cost in these tiers.

The vertices in tier 5 and tier 6 may be the same as those in tier 3 and tier 2, respectively. Irrespective of the direction, the sub-graphs constituted by vertices in tier 2, tier 3, and tier 4 may be the same as those constituted by vertices in tier 4, tier 5, and tier 6. Since RSOA does not modify the wavelength of the light, the data transmission in tier 4, tier 5, and tier 6 may be the reverse process of that in tier 2, tier 3, and tier 4. Moreover, receivers are usually wavelength-insensitive. The bipartite graph constituted by vertices in tier 6 and tier 7 may also be fully connected. Similarly, the number of receivers may have to guarantee the total rate in the PON system.

Figure 3:
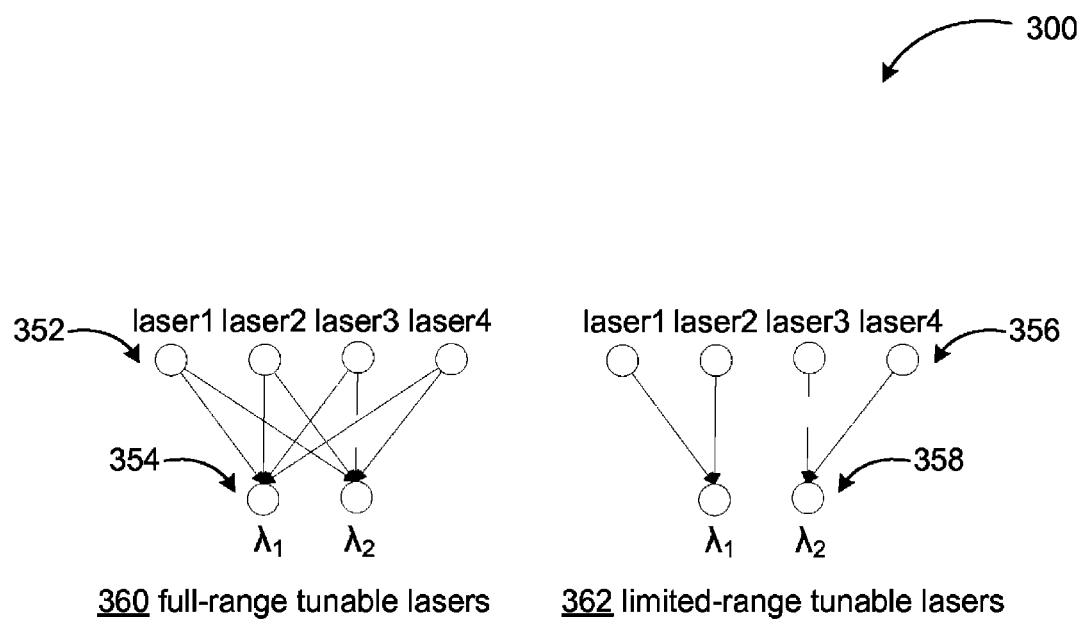
FIG. 3 illustrates an example upstream transmission graph in WDM PON with full-range lasers and limited-range tunable lasers.

FIG. 3 illustrates an example upstream transmission graph in WDM PON with full-range lasers and limited-range tunable lasers. According to some embodiments, a directed bipartite graph may be deployed to describe the relationship between lasers at ONUs and upstream wavelengths. The set of vertices L (352, 356) may be denoted as the set of lasers and the set of vertices W (354, 358) as the set of wavelengths. An edge may exist between a vertex i in set L and a vertex w in set W if a laser i can be tuned to wavelength w. Diagram 300 shows examples of bipartite graphs for four ONUs and two wavelengths. In graph 360, all lasers can be tuned to either of the two wavelengths ($\lambda_1, \lambda_2$). In graph 362, each laser can be tuned to one wavelength ($\lambda_1$ or $\lambda_2$). The traffic that can be transmitted on each laser may depend on the transmission data rate of the laser and the traffic of other lasers. Generally, the traffic transmitted by a laser cannot exceed the laser's maximum transmission data rate, and the total traffic transmitted on a wavelength cannot exceed the capacity of the wavelength.

According some embodiments, an "achievable rate region" may be defined as the region containing traffic rates, which can be guaranteed by the network. For example, in the abstracted graph 244 of FIG. 2, the achievable rate refers to the rate of vertices in tier one. To define the achievable rate region, let R be the upstream traffic rate matrix, where $r_{i,j}$ is the upstream traffic rate of queue j at ONU i. Rate R is achievable if there exists a resource allocation scheme, which can allocate enough resources to guarantee rate R. The resources may include lasers, wavelengths, and/or receivers. For the abstracted graph, the condition may be stated as that R is achievable if there exists a rate assignment scheme satisfying constraints:

(1) for any vertex in the abstracted graph except those in the first tier, the sum of rates on all incoming edges equals the rate of the vertex;
(2) for any vertex in the abstracted graph except those in the last tier, the rate of the vertex is equal to the sum of rates on all outgoing edges; and
(3) the rate of each vertex is no greater than C, where C represents the data rate of each laser, the capacity of each wavelength, and the receiving data rate of each receiver.

Achievable rate region, denoted as R, may contains all the achievable rates, R={achievable rate R}. The volume of R, denoted as $vol_R$, may be defined as $vol_R = \int_R dr_{1,1} \, dr_{1,2} \ldots$. Constraints (1) and (2) of the achievable rate state that there exists a resource allocation scheme to guarantee successful transmission of traffic with rate R. Constraint (3) assures that wavelengths, lasers, and receivers are not overly exploited.

Figure 4:
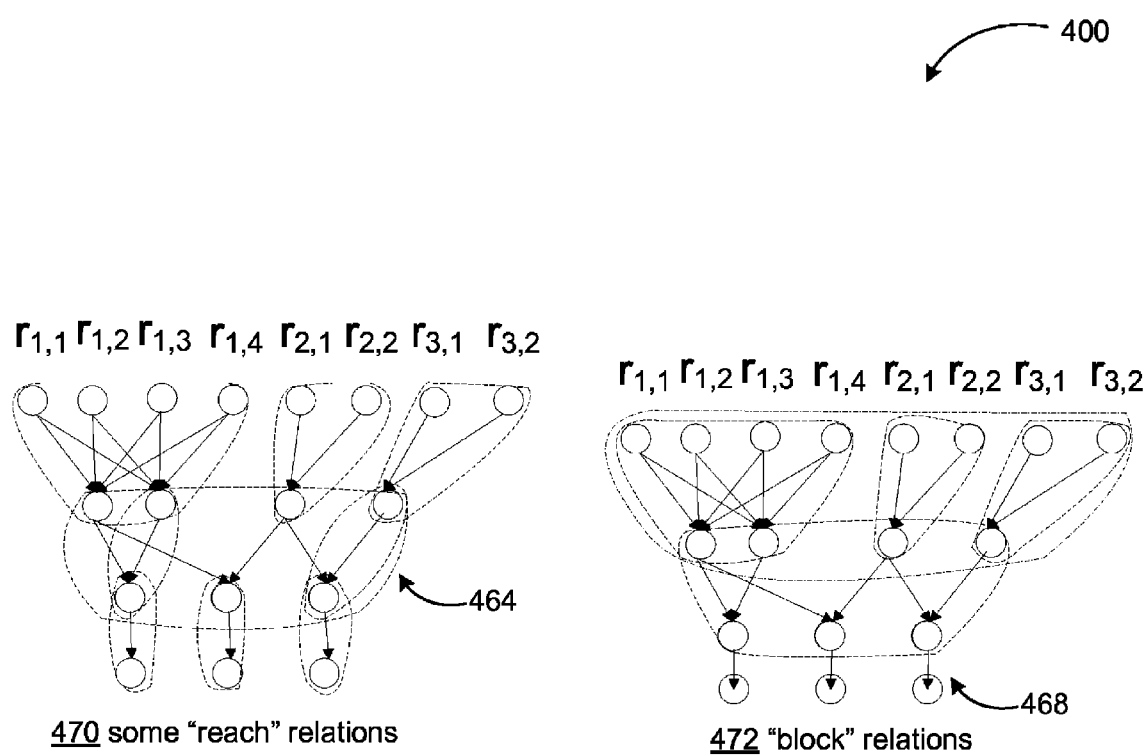
FIG. 4 illustrates example reach and block relations in a WDM PON diagram.

FIG. 4 illustrates example reach and block relations in a WDM PON diagram that is arranged in accordance with at least some examples described herein. To derive the achievable rate region for a given network architecture, a determination needs to be made whether there exists a resource allocation scheme to guarantee the traffic rate. This involves the resource allocation issue. Thus, to determine the achievable rate region, a reach relation and a block relation may be defined according to some embodiments.

The "reach" relation contains substantially all constraints on the achievable rate. To define the reach relation, an assumption may be made that set U contains vertices in tier i, and set V contains vertices in tier j, j>i; if vertices in U can only connect (directly or indirectly) to vertices in V, U may be defined as "reaching" V, denoted as U→V. Graph 470 of diagram 400 illustrates some examples of reach relations (e.g. 464) with respect to the abstracted graph 244 of FIG. 2. The reach relation may have the following effect on R:

Theorem 1. The sum of rates of vertices in set U is no greater than the sum of the maximum rates of vertices in set V if U→V. A rate R may be achievable if it satisfies constraints exerted by reach relations. In another words, constraints of reach relations may limit the achievable rate region of the network. The reach relation may exhibit the transitivity property, as shown in Property 1 below. The transitivity property may transfer constraints on vertices in higher tiers into those on vertices in tier one, which denote the queue requests.

Property 1. Transitivity: Assuming set U contains vertices in tier i, set V contains vertices in tier i+1, and set W contains vertices in tier i+2. If U→V and V→W, then U→W.

As an illustration, the vertex set in the top tier of graph 460 reaches the vertex set in the second tier below the top tier, and the vertex set in the second tier reaches the vertex set in the third tier. Hence, the vertex set in the top tier reaches the vertex set in the third tier.

According to some embodiments, there should exist a resource allocation scheme or rate assignment scheme to guarantee any traffic rate satisfying constraints exerted by the reach relations. The following lemma and theorem addresses this proposal.

Lemma 1. Given a fully-connected bipartite graph G=(U∪V,E), set U contains vertices in tier i, and set V contains vertices in tier i+1, then there exists a resource allocation scheme to guarantee the rate which satisfies $\Sigma_{u \in U} r_u \leq C \cdot |V|$.

Theorem 2. Given a bipartite graph G=(U∪V,E), set U contains vertices in tier i, and set V contains vertices in tier i+1, then there exists a resource allocation scheme to guarantee the rate which satisfies constraints exerted by "reach" relations in G.

The proof for theorem 2 lies in finding a resource allocation scheme to substantially guarantee the rate which satisfies the constraints. If graph G is a fully-connected graph, Lemma 1 may provide the solution. If graph G is not fully connected, it may be decomposed into two sub-graphs $G_1$ and $G_2$, where $G_1 = (U_1 \cup V_1, E_1)$ and $G_2 = (U_2 \cup V_2, E_2)$, and $G = (U_1 \cup U_2 \cup V_1 \cup V_2, E_1 \cup E_2 \cup E_{U_1 V_2})$, where $E_{U_1 V_2}$ refers to edges connecting $U_1$ in $G_1$ and $V_2$ in $G_2$. Let set $V_2^1$ contain the vertices in $V_2$ where vertices in set $U_1$ are connected, $V_2^2 = V_2 \setminus V_2^1$. Reach relations in G may be expressed as:

reach relations in sub-graph $(U_1 \cup V_1 \cup V_2^1, E_1 \cup E_{U_1 V_2})$,
reach relations in sub-graph $(U_2 \cup V_2, E_2)$, and
$U_1 \rightarrow (V_1 \cup V_2^1), U_2 \rightarrow V_2, U_1 \cup U_2 \rightarrow V_1 \cup V_2$.

Let $R^1$ and $R^2$ be the rates of vertices in set $U_1$ and set $U_2$, respectively. In addition to the constraints exerted by reach relations in sub-graphs $(U_1 \cup V_1 \cup V_2^1, E_1 \cup E_{U_1 V_2})$ and $G_2$, $R^1$ and $R^2$ may satisfy the following constraints:

$$\begin{cases} \sum R^2 \leq |V_2| \cdot C \\ \sum R^1 \leq (|V_1| + |V_2^1|) \cdot C \\ \sum R^1 + \sum R^2 \leq (|V_2| + |V_1|) \cdot C \end{cases}$$

The resource allocation schemes in three regions, where (1) $L_1 \subseteq L_2$, (2) $L_1 \cap L_2 = \emptyset$, and (3) $L_1 \cap L_2 = \{\text{connected vertices}\}$, respectively, may be expressed as follows:

1. $\Sigma R^2 \leq |V_2| \cdot C$, and $\Sigma R^1 \leq |V_1| \cdot C$. The determination may be reduced to finding a resource allocation scheme to guarantee $R^1$ in $G_1$ and guarantee $R^2$ in $G_2$.

2. $\Sigma R^1 \leq (|V_1| + |V_2^1|) \cdot C$, and $\Sigma R^2 \leq |V_2^2| \cdot C$; The determination may be reduced to finding a resource allocation scheme to substantially guarantee $R^1$ in graph $(U_1 \cup V_1 \cup V_2^1, E_1 \cup E_{U_1 V_2})$ and guarantee $R^2$ in graph $(U_2 \cup V_2^2, E_2)$.

3. $\Sigma R^1 + \Sigma R^2 \leq (|V_2| + |V_1|) \cdot C$, and $\Sigma R^1 \geq |V_1|) \cdot C$, $\Sigma R^2 \geq |V_2^1| \cdot C$. $R^1$ may be written as $R^1 = R^{1,1} + R^{1,2}$, where $\Sigma R^{1,1} = |V_1| \cdot C$, and $\Sigma R_v^{1,1} = R_v^1$ if vertex v is not connected to $V_2$. The determination may be reduced to finding a resource allocation scheme to substantially guarantee $R^{1,1}$ in $G_1$, and substantially guarantee $R^2 + R^{1,2}$ in graph $(U_1 \cup U_1 \cup V_2, E_2 \cup E_{U_1 V_2})$.

In the above three scenarios, the determination is reduced to guaranteeing rates in two sub-graphs. All of the rates may satisfy their corresponding constraints exerted by the corresponding reach relations. The obtained sub-graphs may be further decomposed into two sub-graphs, and the determination may be reduced to guaranteeing rates in smaller graphs. The decomposition may continue until the resulting graph is fully connected.

Reach relations may contain substantially all the constraints on the achievable rate. To determine the achievable rate region R of a graph, one approach according to at least some embodiments is to determine substantially all the reach relations in the graph. It should be noted that the reach relation may not only be established between the vertex sets in two neighboring tiers, but also between the vertex sets in any two tiers.

Constraints exerted by some of the relations may be naturally satisfied, implying that they are redundant in delineating R. To narrow down active constraints on R, "block" relations (e.g. 466) may be employed as shown in graph 472 of diagram 400.

For any set V containing vertices in tier j, set U containing vertices in tier i (j>i), and if U→V and |U|>|V|, the sum of the maximum rates of vertices in V is less than the maximum sum of rates of vertices in set U, i.e., |V|·C<|U|·C. V may be defined as "blocking" U, denoted as $$V \xrightarrow{block} U.$$

If U→V and |U|≦|V|, the sum of rates of vertices in U is less than the maximum sum of rates of vertices in set V. The constraint exerted by U→V may be naturally satisfied. Thus, only block relations with |U|>|V| may exert active constraints in limiting R. Similar to the reach relation, the block relation may possess the transitivity property, as described in Property 1 above.

Property 2. Transitivity: Assuming set U contains vertices in tier i, set V contains vertices in tier i+1, and set W contains vertices in tier i+2. If $$W \xrightarrow{block} V \text{ and } V \xrightarrow{block} U, \text{ then } W \xrightarrow{block} U.$$

Constraints of some block relations may still be redundant constraints in limiting R. The following illustrate two cases of redundant constraints exerted by some block relations.

Inclusion: assuming V contains vertices in tier j, $U^1$, $U^2$, ... contain vertices in tier i (j>i), and $$V \xrightarrow{block} U^k,$$

∀k. Let U=∪$_k$U$^k$, ∀k, Then, $$V \xrightarrow{block} U.$$

If the sum of rates of vertices in U is less than the sum of maximum rates of vertices in V, then, the sum of rates of vertices in $U^k$, ∀k must be less than the sum of maximum rates of vertices in V. The constraint exerted by the block relation between U and V may imply all constraints exerted by block relations between $U^k$ and V. Constraints of block relations between $U^k$ and V may be redundant. The three block relations $$V \xrightarrow{block} U^1, V \xrightarrow{block} U^2, \text{ and } V \xrightarrow{block} U,$$

may be reducible to a single block relation $$V \xrightarrow{block} U.$$

Independent: assuming $U^1$ and $U^2$ contain vertices in tier i, $V^1$ and $V^2$ contain vertices in tier i+1, $$V^1 \xrightarrow{block} U^1, \text{ and } V^2 \xrightarrow{block} U^2.$$

Then, $$V^1 \cup V^2 \xrightarrow{block} U^1 \cup U^2.$$

If $U^1 \cap U^2$=et and $V^1 \cap V^2$=∅, block relation between $V^1$ and $U^1$ may be independent from that between $V^2$ and $U^2$. If the constraints exerted by $$V^1 \xrightarrow{block} U^1 \text{ and } V^2 \xrightarrow{block} U^2$$

are satisfied, the constraint of $$V^1 \cup V^2 \xrightarrow{block} U^1 \cup U^2$$

may then be satisfied. Thus, $$V^1 \cup V^2 \xrightarrow{block} U^1 \cup U^2$$

may be redundant in limiting R. The three block relations $$V^1 \xrightarrow{block} U^1, V^2 \xrightarrow{block} U^2, \text{ and } V^1 \cup V^2 \xrightarrow{block} U^1 \cup U^2$$

may be reducible to two block relations $$V^1 \xrightarrow{block} U^1 \text{ and } V^2 \xrightarrow{block} U^2.$$

Hence, the achievable rate region R for graph 472 may contain rates satisfying the following constraints:

$$\begin{cases} r_{1,1} + r_{1,2} + r_{1,3} + r_{1,4} \leq 2C \\ r_{2,1} + r_{2,2} \leq C \\ r_{3,1} + r_{3,2} \leq C \\ \sum_{i,j} r_{i,j} \leq 3C \end{cases}$$

Reach relations in a graph may determine the graph's achievable rate region R. Then, constraints exerted by reach relations may be reduced into constraints exerted by block relations, and further provide one or more rules for eliminating redundant block relations.

Figure 5:
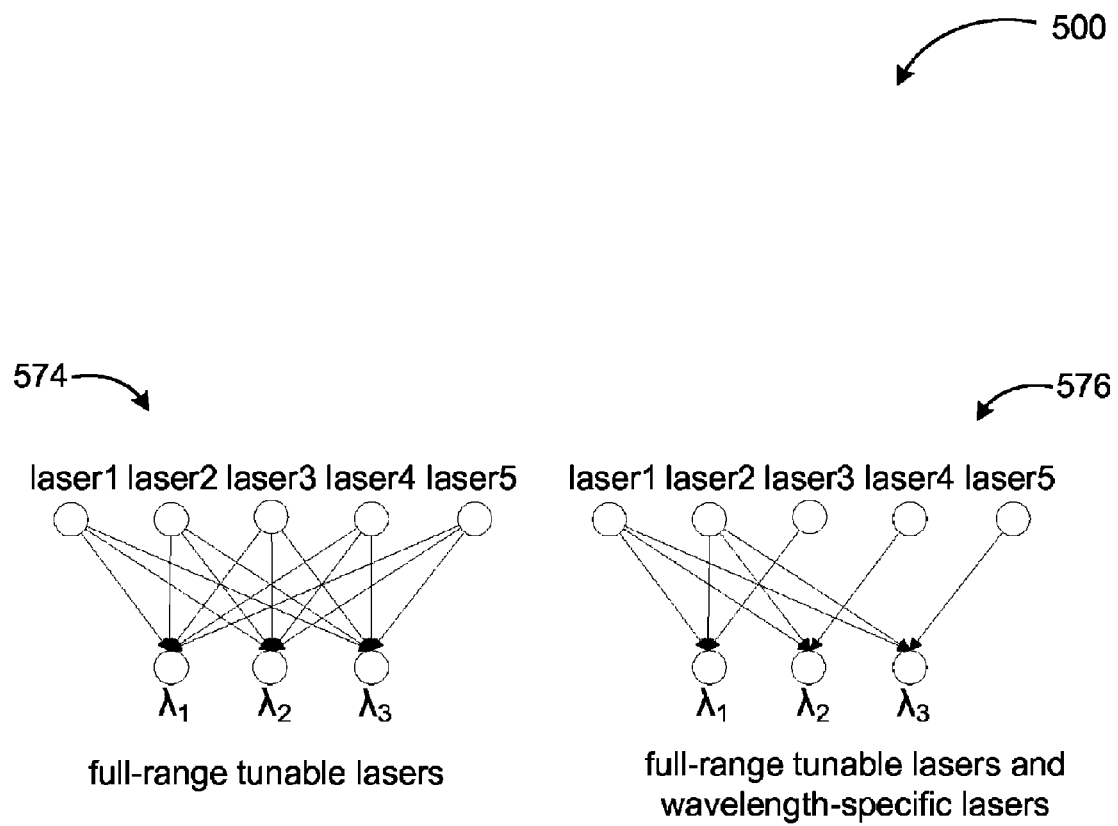
FIG. 5 illustrates an example WDM PON diagram representing full-range tunable lasers and wavelength-specific lasers.

FIG. 5 illustrates an example WDM PON diagram representing full-range tunable lasers and wavelength-specific lasers that are arranged in accordance with at least some examples described herein. Delineation of R for a given WDM PON architecture is discussed above. In some implementations, the dual design challenge for an optimal network may be adversal, i.e., given a rate matrix R to be achieved, a network with the achievable rate region R needs to be configured, where R∈R, by using the proper number and type of lasers, wavelengths, and receivers with substantially minimum cost. The consideration may also be formulated as: given optical devices, design a WDM PON network with the largest volume. Regarding the abstracted tiered graph of FIG. 2, the computations may focus on how to configure the second-tier, third-tier, and fourth-tier vertices, as well as the edges connecting these vertices for given rates of vertices in tier one.

The following notations may be defined to express the relationships between the components of the network: $Q_i$: the set containing queue requests at ONU i, i.e., vertices in tier one at ONU i, $Q=\cup_i Q_i$;

$L_i$: the set containing lasers at ONU i, i.e., vertices in tier two at ONU i, $L=\cup_i L_i$;

W: the set containing all wavelengths, i.e., vertices in tier three;

X: the set containing all receivers, i.e., vertices in tier four.

In an ONU, any laser may be accessed by any queue. The bipartite graph $(Q_i \cup L_i, E_{Q_i L_i})$ is thus fully connected. $Q_i \rightarrow L_i$ may be the only reach relation and determine the sub-graph's achievable rate region. Under the condition that the number of lasers is less than the number of queues, $$L_i \xrightarrow{block} Q_i$$

may be the only block relation. Then, at ONU i, the achievable rate region of the fully-connected bipartite graph $(Q_i \cup L_i, E_{Q_i L_i})$ may be constricted by:

$$\begin{cases} \sum_{q \in Q_i} r_q \leq |L_i| \cdot C \\ r_q \leq C, \forall q \in Q_i \end{cases}$$

When $|L_i| \leq |Q_i|$, the more the lasers, the larger the volume of the achievable rate region of Graph $(Q_i \cup L_i, E_{Q_i L_i})$. When $|L_i|$ is increased beyond $|Q_i|$, further increasing may not enlarge the volume any longer. To achieve a given R, the minimum determined laser cost may imply that $|L_i|$ is selected as $\lceil \Sigma_j r_{i,j}/C \rceil$.

Per the above definition, |W| is the number of wavelengths in the system. Edges connecting L and W may depend on tunabilities of lasers. If all lasers are full-range tunable, the bipartite graph $(L \cup W, E_{LW})$ can be fully-connected. Full-range tunable refers to the case that lasers can be tuned to any of the used wavelengths W in the network. The cost of full-range tunable lasers may be high because of their broad tuning range. For low cost systems, the number of wavelengths may be desired to be small, and the number of full-range lasers desired to be small.

Under the condition that full-range tunable lasers are available, any wavelength in set W may be tuned by any laser. The bipartite graph constituted by L and W may then be fully connected. Thus, limited by the only reach relation L→W, the achievable rate region of the bipartite graph $(L \cup W, E_{LW})$ may be constricted by:

$$\begin{cases} \sum_{l \in L} r_l \leq |W| \cdot C \\ r_l \leq C, \forall l \in L \end{cases}$$

A volume of the achievable rate region may increase in proportion to a number of working wavelengths. However, a large number of wavelengths may imply broad tuning range of lasers and hence high cost. As mentioned above, a number of wavelengths may be desired be as small as possible. To achieve a given rate R, the minimum number of wavelengths |W| may thus be $\lceil \Sigma_i \Sigma_j r_{i,j}/C \rceil$.

To reduce the cost, the lasers' tuning ranges may be reduced while arriving at the same achievable rate region according to some embodiments. On the abstracted bipartite sub-graph representation, the goal corresponds to reducing a number of edges without shrinking R. Block relation plays an active role in shrinking the achievable rate region. Thus, a network with a narrower tuning range may be configured without shrinking R by reducing the edges without introducing block relations in the abstracted graph. Theorem 1 provides an approach for reducing the number of edges without shrinking R.

In the scenario of lasers and wavelengths, as compared to the scheme of letting all |U| lasers be full-range tunable to all |V| wavelengths, the approach for reducing lasers' tuning wavelengths without shrinking R may be as follows: Let each of |V| lasers be respectively tuned to one wavelength, and all the other |U|−|V| lasers are full-range tunable to every wavelength.

Applying Theorem 1 to the bipartite graph $(L \cup W, E_{LW})$, the following conclusions may be drawn in terms of the number of lasers |L| and the number of wavelengths |W|:

|W|<|L|; |L|−|W| lasers with full-range tunability and |W| wavelength-specific lasers can achieve the largest volume of R. This number may not be further reduced; otherwise, R has to shrink.

|W|=|L|; wavelength-specific lasers can achieve the largest volume of R, and no tunable lasers are needed.

|W|>|L|; |W|−|L| wavelengths may be wasted. Increasing a number of wavelengths may not increase the volume of R.

In diagram 500 of FIG. 5, graph 574 shows and example of using full-range tunable lasers, where any of the five lasers may be tuned to any of the three wavelengths. Graph 576 illustrates a scheme of reducing the number of full-range tunable lasers. In graph 576, laser 1 and laser 2 may be tuned to any of the three wavelengths, while laser 3, laser 4, and laser 5 may be wavelength-specific lasers tuned to wavelength 1, 2, and 3, respectively. Both illustrated cases can accommodate the same admissible traffic rate. Thus, the configuration as shown in graph 576, as compared to the configuration in graph 574, may reduce the number of full-range tunable lasers from five to two in line with the above described conclusions.

Figure 6:
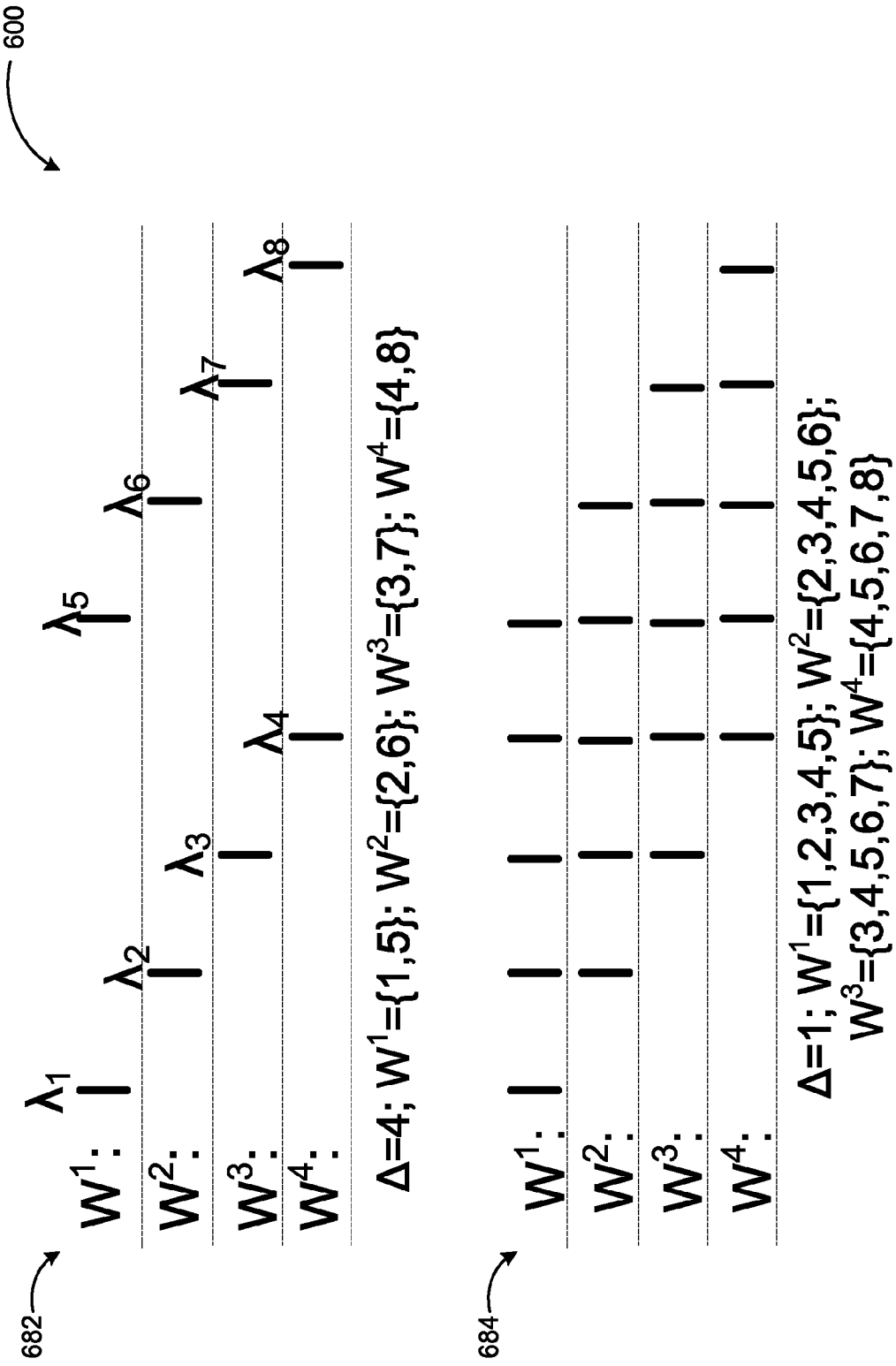
FIG. 6 illustrates a diagram of example tuning ranges for limited-range tunable lasers.

FIG. 6 illustrates a diagram of example tuning ranges for limited-range tunable lasers that are arranged in accordance with at least some examples described herein. At least some of the embodiments are directed to optimizing a WDM PON architecture under the condition that full-range tunable lasers are not available, i.e., lasers can only tune to a subset of the wavelengths (limited-range tunable lasers).

Assuming the wavelength set $W=\{1, 2, \ldots, |W|\}$, the tuning wavelengths of available lasers are continuous, and the number of lasers' tuning wavelengths is $\xi$. Then, there may be $|W|-\xi+1$ possibilities of tuning ranges, i.e., $\{1, 2, \ldots, \xi\}$, $\{2, 3, \ldots, \xi+1\}$, $\ldots$, $\{|W|-\xi+1, \ldots, |W|\}$. Let $W_1$, $W_2$, $W_3, \ldots, W_{|W|-\xi+1}$ be sets describing tuning ranges, $W_1=\{1, 2, \ldots, \xi\}$, $W_2=(2, 3, \ldots, \xi+1)$, $\ldots$. Assuming lasers of these tuning ranges are available and of equal cost. Let set $L_i$ contain lasers with tuning range of $W_i$, then $L_i \rightarrow W_i$, $L_i \cap L_j = \emptyset$, $\forall i \neq j$, and $\cup_{i=1}^{|W|-\xi+1} L_i = L$. The determination of tuning ranges of lasers may be converted to deciding lasers $L_i$ for wavelength range $W_i$, $i \in \{1, 2, \ldots, |W|-\xi+1\}$.

In the above computations, the traffic rates of users R may be either known or unknown. Under the condition that R is unknown, for example, the network operator does not know about the traffic information in an area, the wavelength ranges may be tuned by an equal number of lasers for the purpose of load-balancing. That is, $|L|/(|W|-\xi+1)$ lasers, on average, may be tuned to $W_i$, $\forall i$.

Defining N and $\Delta$ as the number of a laser's tuning wavelengths and the interval between the laser's tuning wavelengths (channel spacing), respectively, both N and $\Delta$ may range from 1 to $|W|$. Diagram 600 illustrates two example cases for illustration purposes. Graph 682 shows distribution of wavelengths when all lasers have the same $\Delta$ and $N=|W|/\Delta$ with the specific values for $|W|=8$ and $\Delta=4$. The available lasers in this scenario may accommodate $\Delta$ kinds of tuning ranges (e.g. $W_1=\{1,5\}$, $W_2=\{2,6\}$, $W_3=\{3,7\}$, $W_4=\{4,8\}$). Thus, in case of all lasers having the same $\Delta$ and $N=|W|/\Delta$ any two tuning ranges may not have overlapping wavelengths.

The second example scenario illustrated in graph 684 is a special case of when all lasers have the same N and $\Delta=1$. In the illustrated distribution, $|W|=8$, $N=5$, and $\Delta=1$. In this second scenario, there may be overlapping wavelengths. It should be noted that embodiments are not limited to the illustrated N and $\Delta$ values. Indeed, N and $\Delta$ may have any value.

When R is unknown, to achieve the largest volume of the achievable rate region of bipartite graph $(L \cup W, E_{LW})$, $W_i$ may not block $L_i$, $\forall i$. That is, $|L|/(|W|-\xi+1) \geq |W_i|$, $\forall i$. The condition states that enabling any $W_i$ not blocking $L_i$ may require the number of wavelengths $|W|$ be greater than a lower bound, and the broadness of the tuning range is upper and lower bounded, which may be determined by the numbers of wavelengths and lasers.

The above described scheme treats every laser equally. Geometrically, the achievable region may extend with the same degree in all dimensions. Under the condition of non-uniform distribution of traffic rates in lasers, this scheme may not achieve the given traffic rate.

Figure 7:
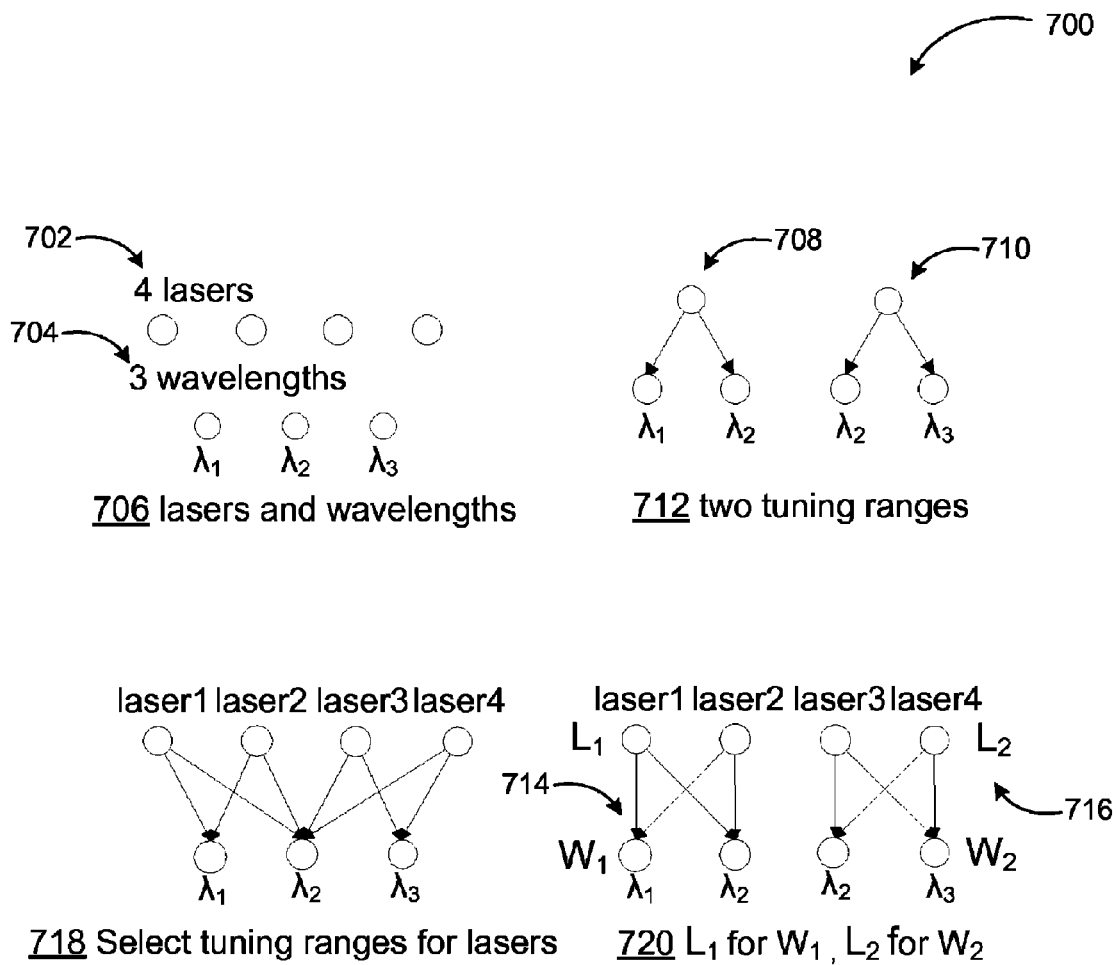
FIG. 7 illustrates an example selection of proper tuning ranges for tunable lasers in a WDM PON diagram.

FIG. 7 illustrates an example selection of proper tuning ranges for tunable lasers in a WDM PON diagram that is arranged in accordance with at least some examples described herein. Assuming R is known to the network operator. Deciding $L_i$ for each $W_i$ needs to guarantee R to be within R. The determination of the optimum configuration may be formulated as follows:

Given: $R$, $W_i$

Obtain: $L_i$, $1 \leq i \leq |W|-\xi+1$

-continued subject to: $\sum_{l \in L} R_l \leq C \cdot |W|$; (constraint 1)

$\sum_{l \in L_i} R_l \leq C \cdot \xi$, for $i = 1, 2, \ldots, a$; (constraint 2)

$\bigcup_{i=1}^{|W|-\xi+1} L_i = L$; and (constraint 3)

$L_i \cap L_j = \emptyset$, $\forall i \neq j$. (constraint 4)

Constraint (1) may result from the reach relation $L \rightarrow W$. Constraint (2) is a result of reach relations $L_i \rightarrow W_i$, $\forall i$. Constraints (3) and (4) state that each laser may have one tuning range. This constraint satisfaction may be determined by the following scheme: $i=1$ to $|W|-\xi L_i = \emptyset$ $\Sigma_{l \in L_i} R_l > C \cdot \xi$ select any element from L, denoted as $l^*$ $\Sigma_{l \in L_i} R_l + R_{l^*} > C \cdot \xi l^*$ is included into $L_i$ $l^*$ is deleted from L include all the remaining elements in L into set $L_{|W|-\xi+1}$.

For $L_1, \ldots, L_{|W|-\xi}$, the scheme may guarantee $\Sigma_{l \in L_i} R_l \leq C \cdot \xi$. It can be shown that set $L_{|W|-\xi+1}$ satisfies $\Sigma_{l \in L_{|W|-\xi+1}} R_l \leq qC \cdot \xi$ as well. Since $R_l \leq C$, $\forall l$, $\Sigma_{l \in L_i} R_l > C \cdot \xi - C$, $\forall i \leq |W|-\xi$. Letting $\Sigma_{l \in L_i} R_l = C \cdot \xi - C + \epsilon$, $0 < \epsilon \leq C$, then $$\sum_{l \in L_{|W|-\xi+1}} R_l \leq |W| \cdot C - (|W|-\xi)[(\xi-1)C + \varepsilon] \leq$$

$$|W| \cdot C - (|W|-\xi)(\xi-1)C = (|W|-\xi)(2-\xi)C + \xi C$$

Thus, if $\xi \geq 2$, $\Sigma_{l \in L_{|W|-\xi+1}} R_l \leq \xi \cdot C$. The above scheme may obtain a solution to the determination of network optimization when R is known. If $\xi=1$, the lasers are wavelength-specific, and the computation may become a partition problem, which may be solved employing a heuristic algorithm. If the above analysis is approached using N and $\Delta$ with each laser being tunable to N wavelengths and $\Delta=1$, there may be $|W|-N+1$ kinds of tuning ranges.

Returning to FIG. 7, diagram 700 shows an example of the aforementioned process. Graph 706 shows that there are three wavelengths 704 and four lasers 702, and the tuning range $N=2$. The lasers' tuning ranges may be either $W_1=\{\lambda_1, \lambda_2\}$ (708) or $W_2=\{\lambda_2, \lambda_3\}$ (710) as shown graph 712. Two lasers may be tuned to $\{\lambda_1, \lambda_2\}$, and the other two lasers be tuned to $\{\lambda_2, \lambda_3\}$, as shown in graph 718 (tuning range selection for lasers). For both $W_1$ and $W_2$, the results may be $L_1=W_1$ (714) and $L_2=W_2$ (716) as shown in graph 720.

When a number of wavelengths $N=1$, the lasers are wavelength specific, and the determination becomes a partition problem, which may be solved as discussed previously. When $N \geq 2$, an algorithm such as the one described below may be employed to determine the set L.

for $i=1$ to $|W|-N$ do
$L_i$=empty set
while $\Sigma_{i \in L_i} R_i < CN$ do
Select any element from L denoted as $l^*$
if $\Sigma_{i \in L_i} R_i + R_{l^*} < CN$ then
$l^*$ is included into $L_i$
$l^*$ is deleted from L
end if
end while
end for
Include all remaining elements in L in to set $L^{|W|-N+1}$ The above described algorithm is for illustration purposes and does not constitute a limitation on embodiments.

Embodiments may be implemented with other algorithms using the principles described herein.

Figure 8:
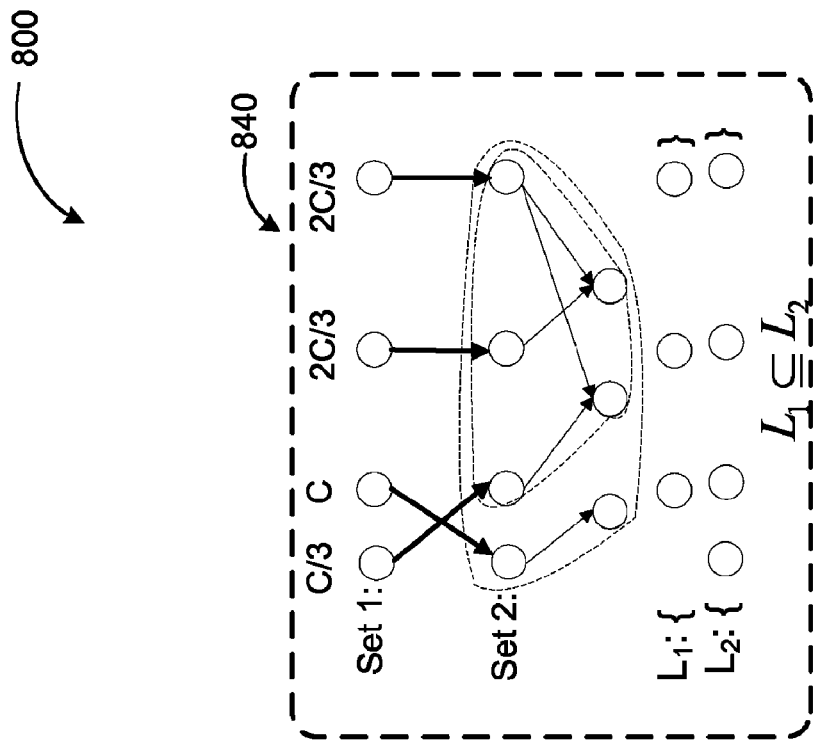
FIG. 8 illustrates an example scenario of determining a bipartite graph when a number of lasers with specific tuning ranges are given.
Figure 8:
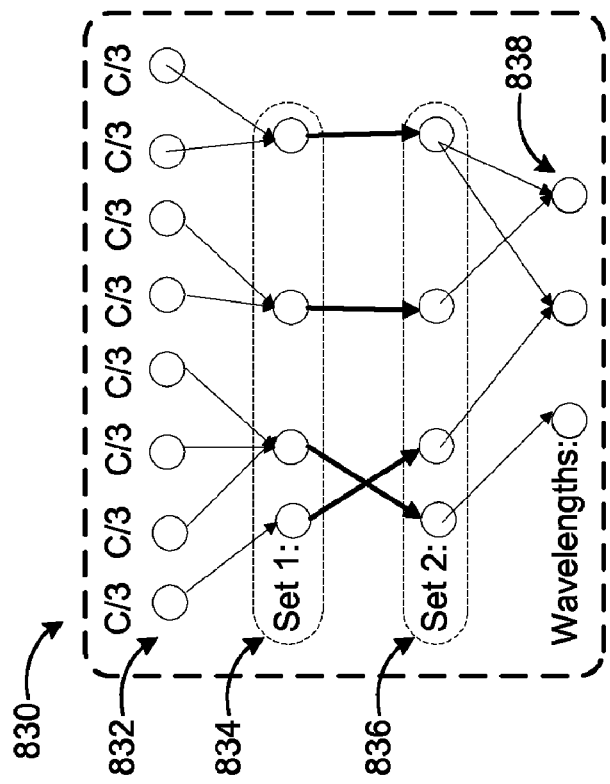
Figure 9:
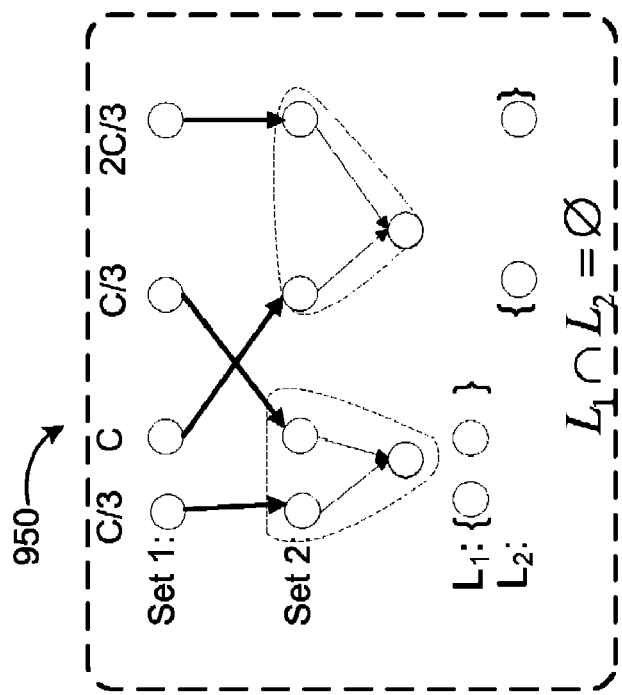
FIG. 9 illustrates another example scenario of determining a bipartite graph when a number of lasers with specific tuning ranges are given.
Figure 9:
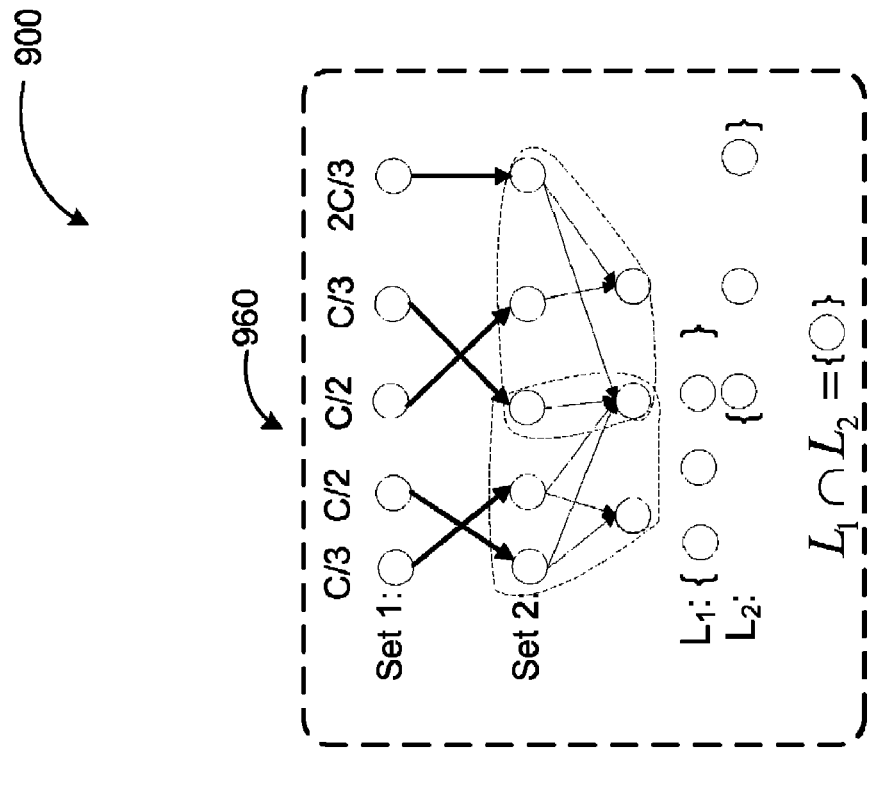

FIG. 8 illustrates an example scenario of determining a bipartite graph when a number of lasers with specific tuning ranges are given in accordance with at least some embodiments described herein. In the above scenarios, multiple choices of lasers' tuning ranges have been discussed. FIGS. 8 and 9 illustrate scenarios, where a predefined number, |L|, lasers are available, each with a specific tuning range. According to some embodiments, available lasers may be distributed to ONUs as follows. As shown in graph 830 of diagram 800, there may be actually two laser sets. Set 1 (834) may contain lasers equipped at ONUs. Set 2 (836) may contain given lasers with specific tuning ranges. Lasers in Set 1 (834) may be connected with queue requests 832, while lasers in Set 2 may be connected with wavelengths 838. Each laser in Set 1 (834) may select one laser in Set 2 (836). If the traffic rate on Set 1(834) is known a priori, a successful matching scheme may be able to guarantee the pre-known traffic rate. In other words, the pre-known traffic rate may be within the achievable rate region of the graph.

Set 2 (836) containing given lasers with specific tuning ranges and the wavelength set W may form a bipartite graph (Set 2∪W,E). The matching may enable rates of lasers in Set 1 (834) to be within the achievable rate region of the graph. The block relations in the bipartite graph may first be determined, and then the laser set partitioned into subsets based on the block relations. As long as traffic rates of lasers satisfy all constraints exerted by the block relations, the traffic rate may be achievable.

Assuming $$L_i \xrightarrow{block} W_i \text{ and } L_j \xrightarrow{block} W_j$$

are any two block relations. There may be three possibilities of $L_i$ and $L_j$: $L_i \cap L_j = \emptyset$, $L_i \cap L_j \neq \emptyset$, $L_i \subset L_j$ or $L_i \supset L_j$. Laser set $L_i \cup L_j$ may be partitioned into $L_i$ and $L_j$ for the three cases, respectively, as follows:

Assuming $L_i \subset L_j$ or $L_i \supset L_j$, a subset $L_i$ of $L_j$ may be determined with the objective of enabling set $L_i$ which satisfies: $\Sigma_{l \in L_i} R_l < C \cdot |W_i|$. Lasers with the smallest determined rates may be chosen into set $L_i$, as shown in graph 840.

FIG. 9 illustrates another example scenario of determining a bipartite graph when a number of lasers with specific tuning ranges are given in accordance with at least some embodiments. Diagram 900 illustrates two cases of partitioning laser set $L_i \cup L_j$ into $L_i$ and $L_j$, namely $L_i \cap L_j = \emptyset$ and $L_i \cap L_j \neq \emptyset$.

In the case of $L_i \cap L_j = \emptyset$ as shown in graph 950, the computation becomes an NP-complete partition problem. In an NP-complete partition problem, an algorithm may be used to decide whether a given multi-set of integers can be partitioned into two halves that have the same sum. More precisely, given a multi-set of integers, is there a way to partition the multi-set into two subsets such that the sum of the numbers in the first subset equals the sum of the numbers in the second subset. The subsets may form a partition in the sense that they are disjoint and they cover the multi-set.

In the case of $L_i \cap L_j \neq \emptyset$ as shown in graph 960, an overlap set $\Theta$ may be defined such that $\Theta = L_i \cap L_j$. Then, $$\begin{cases} \sum_{l \in L_i} R_l \leq C \cdot |W_i| & (1) \\ \sum_{l \in L_j} R_l \leq C \cdot |W_j| & (2) \end{cases}$$

$$\Rightarrow \sum_{l \in L_i} R_l + \sum_{l \in L_j} R_l \leq C \cdot (|W_i| + |W_j|)$$

$$\Rightarrow \sum_{l \in \Theta} R_l \leq C \cdot (|W_i| + |W_j|) - \sum_{l \in L} R_l.$$

To satisfy the last constraint, lasers with the smallest determined rates may be included into set $\Theta$. The remaining computation for partitioning $L/\Theta$ into $L_i/\Theta$ and $L_j/\Theta$ is the same as described above in conjunction with the second scenario. Since the above three scenarios contain all the relations between any two sets, the matching may be accomplished by recursively partitioning the laser set L into subsets according to schemes described above until the partitioned subset does not contain any subset with block relations.

While embodiments have been discussed above using specific examples, components, scenarios, and configurations, they are intended to provide a general guideline to be used for maximizing a capacity of WDM PONS. These examples do not constitute a limitation on the embodiments, which may be implements using other components, maximization schemes, and configurations using the principles described herein. For example, other algorithms may be implemented than those provided as example for partitioning sets of lasers, and the like. Furthermore, other parameters than those discussed herein such as channel spacing parameter Δ may be used to analyze abstracted graphs representing WDM networks.

Figure 10:
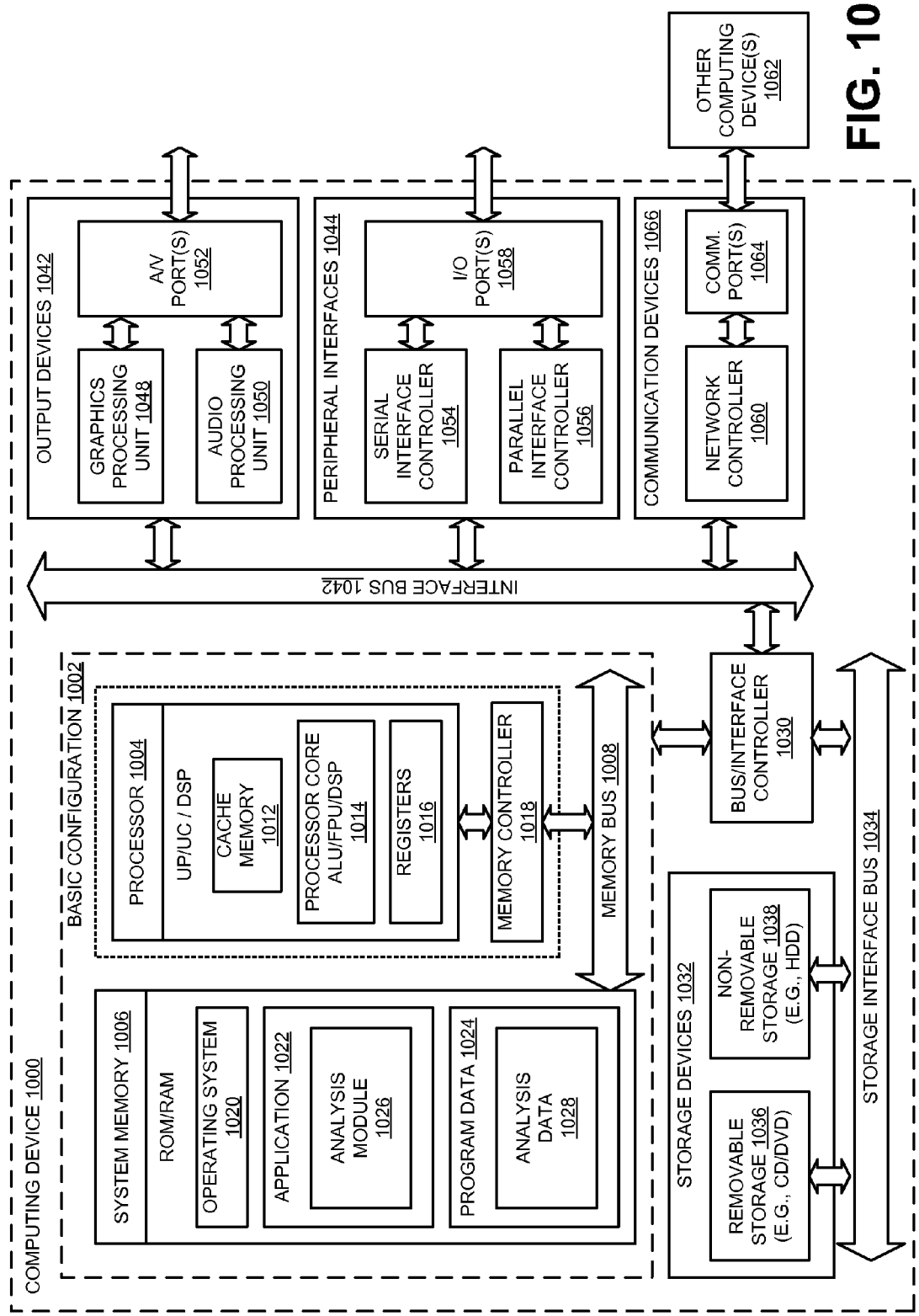
FIG. 10 illustrates a general purpose computing device, which may be used to implement a capacity enhancement algorithm for WDM PONs.

FIG. 10 illustrates an example general purpose computing device 1000, which may be used to implement maximization of a capacity of WDM PONs according to at least some examples of the present disclosure. In a very basic configuration 1002, computing device 1000 typically includes one or more processors 1004 and a system memory 1006. A memory bus 1008 may be used for communicating between processor 1004 and system memory 1006.

Depending on the desired configuration, processor 1004 may be of any type including but not limited to a microprocessor (μP), a microcontroller (μC), a digital signal processor (DSP), or any combination thereof. Processor 1004 may include one more levels of caching, such as a level cache memory 1012, a processor core 1014, and registers 1016. Example processor core 1014 may include an arithmetic logic unit (ALU), a floating point unit (FPU), a digital signal processing core (DSP Core), or any combination thereof. An example memory controller 1018 may also be used with processor 1004, or in some implementations memory controller 1018 may be an internal part of processor 1004.

Depending on the desired configuration, system memory 1006 may be of any type including but not limited to volatile memory (such as RAM), non-volatile memory (such as ROM, flash memory, etc.) or any combination thereof. System memory 1006 may include an operating system 1020, one or more applications 1022, and program data 1024. Application 1022 may include an analysis module 1026 that is arranged to generate abstracted graphs of desired or existing WDM PONs, analyze the graphs and determine optimal capacity/cost parameters, and any other processes, methods and functions as discussed above. Program data 1024 may include one or more of analysis data 1028 (e.g. network traffic data, component characteristics, geographic data, etc.) and similar data as discussed above in conjunction with at least FIG. 6. This data may be useful for determining maximized network capacity for a given traffic rate and minimized equipment cost as is described herein. In some embodiments, application 1022 may be arranged to operate with program data 1024 on operating system 1020 such that WDM PONs are analyzed as described herein. This described basic configuration 1002 is illustrated in FIG. 10 by those components within the inner dashed line.

Computing device 1000 may have additional features or functionality, and additional interfaces to facilitate communications between basic configuration 1002 and any required devices and interfaces. For example, a bus/interface controller 1030 may be used to facilitate communications between basic configuration 1002 and one or more data storage devices 1032 via a storage interface bus 1034. Data storage devices 1032 may be removable storage devices 1036, non-removable storage devices 1038, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 1006, removable storage devices 1036 and non-removable storage devices 1038 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 1000. Any such computer storage media may be part of computing device 1000.

Computing device 1000 may also include an interface bus 1040 for facilitating communication from various interface devices (e.g., output devices 1042, peripheral interfaces 1044, and communication devices 1066 to basic configuration 1002 via bus/interface controller 1030. Example output devices 1042 include a graphics processing unit 1048 and an audio processing unit 1050, which may be configured to communicate to various external devices such as a display or speakers via one or more A/V ports 1052. Example peripheral interfaces 1044 include a serial interface controller 1054 or a parallel interface controller 1056, which may be configured to communicate with external devices such as input devices (e.g., keyboard, mouse, pen, voice input device, touch input device, etc.) or other peripheral devices (e.g., printer, scanner, etc.) via one or more I/O ports 1058. An example communication device 1066 includes a network controller 1060, which may be arranged to facilitate communications with one or more other computing devices 1062 over a network communication link via one or more communication ports 1064.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 1000 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 1000 may also be implemented as a personal computer including both laptop computer and non-laptop computer configurations. Moreover computing device 1000 may be implemented as a networked system or as part of a general purpose or specialized server.

Networks for a networked system including computing device 1000 may comprise any topology of servers, clients, switches, routers, modems, Internet service providers, and any appropriate communication media (e.g., wired or wireless communications). A system according to embodiments may have a static or dynamic network topology. The networks may include a secure network such as an enterprise network (e.g., a LAN, WAN, or WLAN), an unsecure network such as a wireless open network (e.g., IEEE 802.11 wireless networks), or a world-wide network such (e.g., the Internet). The networks may also comprise a plurality of distinct networks that are adapted to operate together. Such networks are configured to provide communication between the nodes described herein. By way of example, and not limitation, these networks may include wireless media such as acoustic, RF, infrared and other wireless media. Furthermore, the networks may be portions of the same network or separate networks.

Example embodiments may also include methods. These methods can be implemented in any number of ways, including the structures described herein. One such way is by machine operations, of devices of the type described in the present disclosure. Another optional way is for one or more of the individual operations of the methods to be performed in conjunction with one or more human operators performing some of the operations while other operations are performed by machines. These human operators need not be collocated with each other, but each can be only with a machine that performs a portion of the program. In other examples, the human interaction can be automated such as by pre-selected criteria that are machine automated.

Figure 11:
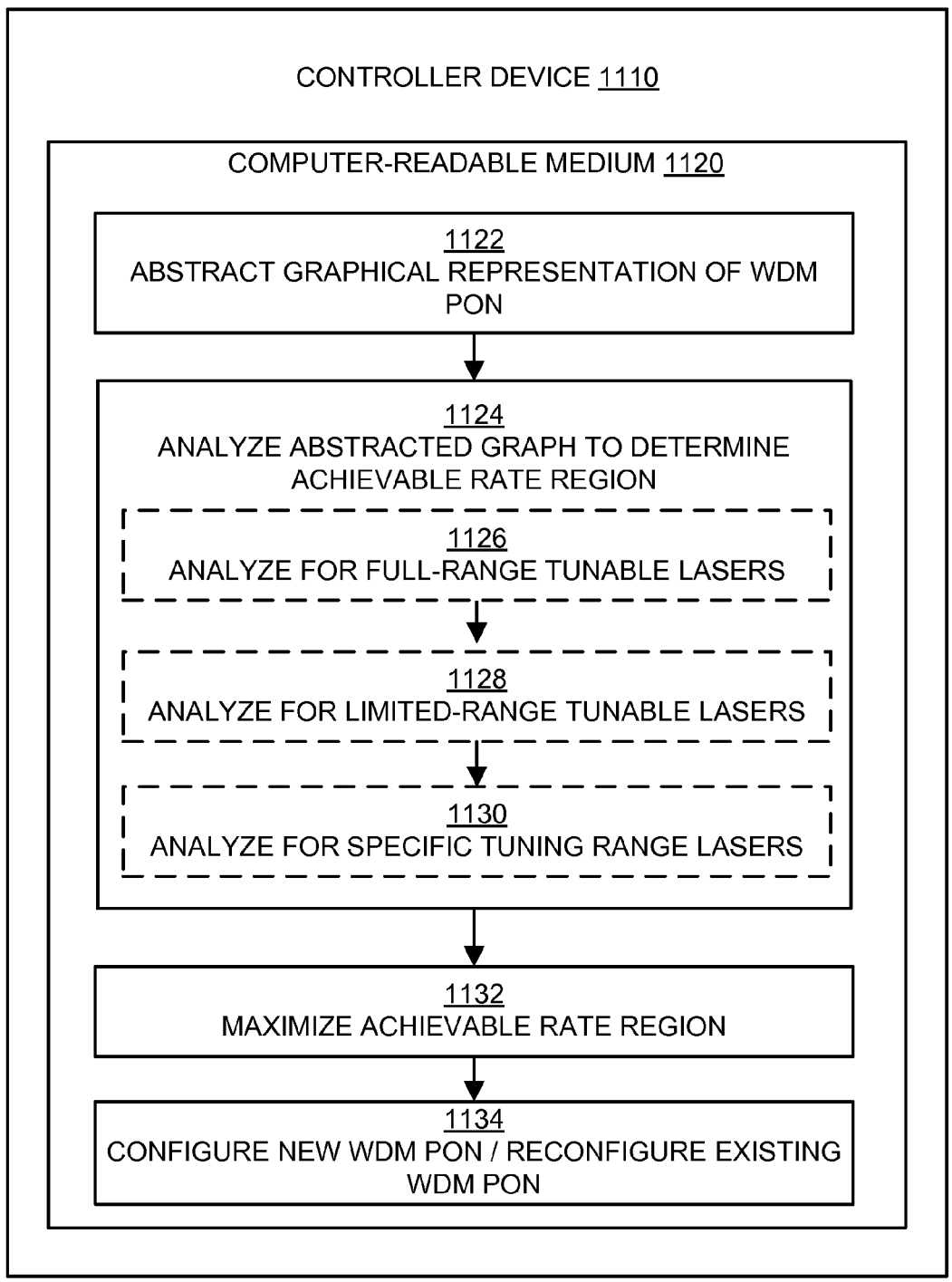
FIG. 11 is a flow diagram illustrating an example method that may be performed by a computing device such as device 1000 in FIG. 10.

FIG. 11 is a flow diagram illustrating some example methods that may be performed by a computing device such as device 1000 in FIG. 10, arranged in accordance with at least some embodiments described herein. The operations described in blocks 1122 through 1132 may be stored as computer-executable instructions in a computer-readable medium such as computer-readable medium 1120 of controller device 1110. Controller device 1110 may be a special purpose computing device that may execute algorithms for maximizing WDM PON capacity as described above in conjunction with general purpose computing device 1000.

A process of maximizing capacity of a WDM PON may include one or more operations, functions or actions as is illustrated by one or more of blocks 1122, 1124, 1126, 1128, 1130, 132, and/or 1134.

Some example processes may begin with operation 1122, "ABSTRACT GRAPHICAL REPRESENTATION OF WDM PON". At operation 1122, a desired or given PON network structure (e.g. ONUs, OLTs, RNs, etc.) may be determined by a processor of a computing device such as processor 1004 of computing device 1000 establishing nodes of the network, characteristics or each node, expected or existing data traffic, and/or comparable parameters.

Operation 1122 may be followed by operation 1124, "ANALYZE ABSTRACT GRAPH TO DETERMINE ACHIEVABLE RATE REGION." At operation 1124, the processor (e.g. processor 1004) may determine the achievable rate region defined as the set containing substantially all admissible traffic rate of a given WDM PON. Since the achievable rate region may be determined differently for different types of network structures, operation 1124 may include at least three sub-operations.

Operation 1124 may include one or more sub-operations as are illustrated by blocks 1126, 1128 and/or 1130. At sub-operation 1126, "ANALYZE FOR FULL-RANGE TUNABLE LASERS", processor 1004 may analyze a bipartite graph of ONUs equipped with full-range lasers and attempt to reduce a number of needed lasers and/or tuning range of the available lasers as described herein.

Sub-operation 1126 may be followed by sub-operation 1128, "ANALYZE FOR LIMITED-RANGE TUNABLE LASERS." At sub-operation 1128, the processor (e.g. processor 1004) may determine a bipartite graph for limited-range lasers and attempt to reduce a number of needed lasers based on whether a largest volume R is known or unknown. If R is know, the processor may execute a partitioning algorithm to determine a minimum number of lasers for a given network traffic structure. Otherwise, the processor may analyze the lasers and the wavelengths without introducing block relations to the system, which may shrink R.

Sub-operation 1128 may be followed by sub-operation 1130, "ANALYZE FOR SPECIFIC TUNING RANGE LASERS." At sub-operation 1130, the processor (e.g. processor 1004) may analyze the bipartite graph of laser and wavelength sets to match the lasers and wavelengths in an optimal configuration.

Operation 1124 may be followed by operation 1132, "MAXIMIZE ACHIEVABLE RATE REGION." At operation 1132, the processor (e.g. processor 1004) may employ the analysis results to determine a maximum achievable rate region for the WDM PON such that minimum number of lasers, wavelengths, and narrowest tuning ranges can be used for maximum data traffic.

Operation 1132 may be followed by operation 1134, "CONFIGURE NEW WDM PON/RECONFIGURE EXISTING WDM PON." At operation 1134, the processor (e.g. processor 1004) may provide the analysis results to an administrator, network provider, or similar entity such that an existing network may be reconfigured or a new network may be configured. The results may be provided through a variety of means networked communications through the communication device 1064, output to a peripheral device through peripheral interfaces 1044, output to an output device 1042, or storage in a storage device 1032 of computing device 1000.

The operations included in the process described above are for illustration purposes. Maximizing a capacity of WDM PONs may be implemented by similar processes with fewer or additional operations. In some examples, the operations may be performed in a different order. In some other examples, various operations may be eliminated. In still other examples, various operations may be divided into additional operations, or combined together into fewer operations. Although illustrated as sequentially ordered operations, in some implementations the various operations may be performed in a different order, or in some cases various operations may be performed at substantially the same time.

Figure 12:
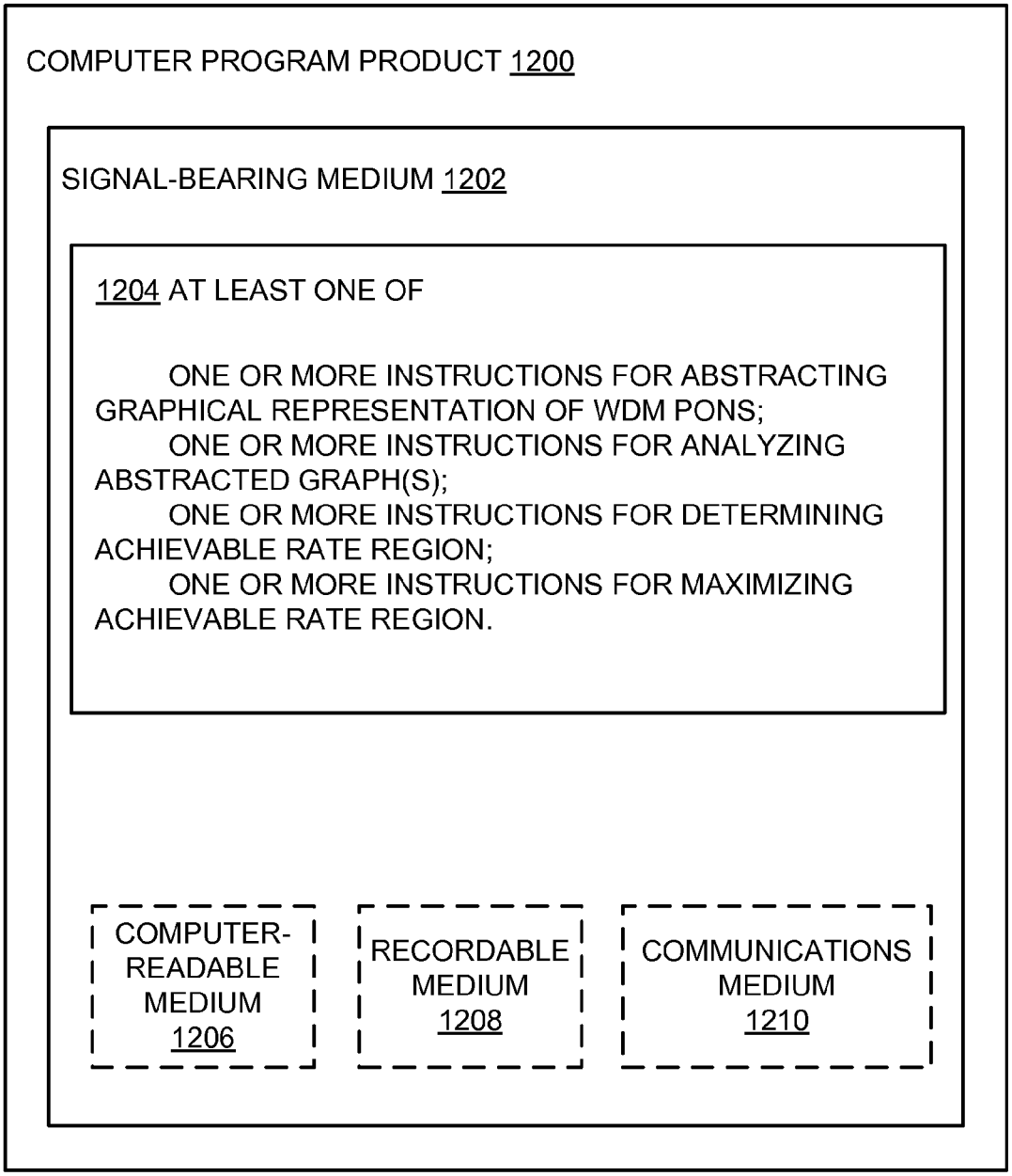
FIG. 12 illustrates a block diagram of an example computer program product, all arranged in accordance with at least some embodiments described herein.

FIG. 12 illustrates a block diagram of an example computer program product 1200 arranged in accordance with at least some embodiments described herein. In some examples, as shown in FIG. 12, computer program product 1200 may include a signal bearing medium 1202 that may also include machine readable instructions 1204 that, when executed by, for example, a processor, may provide the functionality described above with respect to FIG. 3 through FIG. 9. Thus, for example, referring to processor 1004, one or more of the tasks shown in FIG. 12 may be undertaken in response to instructions 1204 conveyed to the processor 1004 by medium 1202 to perform actions associated with analyzing a WDM PON as described herein. Some of those instructions may include abstracting graphical representation of the WDM PON, analyzing the abstracted graph, determining an achievable rate region based on the analysis, and maximizing the achievable rate region.

In some implementations, signal bearing medium 1202 depicted in FIG. 12 may encompass a computer-readable medium 1206, such as, but not limited to, a hard disk drive, a Compact Disc (CD), a Digital Video Disk (DVD), a digital tape, memory, etc. In some implementations, signal bearing medium 1202 may encompass a recordable medium 1208, such as, but not limited to, memory, read/write (R/W) CDs, R/W DVDs, etc. In some implementations, signal bearing medium 1202 may encompass a communications medium 1210, such as, but not limited to, a digital and/or an analog communication medium (e.g., a fiber optic cable, a waveguide, a wired communications link, a wireless communication link, etc.). Thus, for example, computer program product 1200 may be conveyed to the processor 1004 by an RF signal bearing medium 1202, where the signal bearing medium 1202 is conveyed by a wireless communications medium 1210 (e.g., a wireless communications medium conforming with the IEEE 802.11 standard).

In some examples, the present disclosure describes a method for determining a capacity of a wavelength division multiplexing (WDM) passive optical network (PON), the method comprising: abstracting a graphical representation of the WDM PON 1122; analyzing the abstracted graphical representation to determine an achievable rate region of the WDM PON, wherein the achievable rate region includes a set of admissible traffic rates for the WDM PON 1124; and determining a maximum achievable rate region based on optimizing nodes and node relations of the WDM PON 1132. In some further examples, the present disclosure further describes the method according to claim 1, further comprising one or more of: configuring a new WDM PON and/or reconfiguring an existing WDM PON utilizing the optimized nodes and node relations based on the maximum achievable rate region 1134.

In some further examples, the present disclosure further describes the method according to claim 2, further comprising one or more of: replacing a portion of the full-range tunable lasers with fixed-tuned lasers 576, determining restricted tuning ranges for limited-range tunable lasers, and/or allocating specific tuning range lasers among available optical network units (ONUs) 106, 108. In some further examples, the present disclosure further describes the method according to claim 1, wherein abstracting the graphical representation comprises generating a directional tiered graph 244, 246 with directions of connections between nodes of the graph representing directions of light signal in the WDM PON.

In some further examples, the present disclosure further describes the method according to claim 1, wherein determining the maximum achievable rate region comprises one or more of: identifying a largest volume of, traffic capacity for a predefined set of available nodes, determining one or more of smallest number of wavelengths 704, smallest number of lasers 702, and/or narrowest tuning ranges to be used by the optimized nodes of the WDM PON for a predefined volume of traffic. In some further examples, the present disclosure further describes the method according to claim 1, wherein analyzing the abstracted graphical representation includes analyzing one or more of full-range tunable lasers 574, limited-range tunable lasers, and/or specific tuning range lasers.

In some further examples, the present disclosure further describes the method according to claim 1, wherein abstracting a graphical representation includes determining a structure of the WDM PON, the structure including one of a first architecture 240 comprising ONUs 106, 108 equipped with lasers and optical line terminals (OLTs) 102 equipped with receivers, and a second architecture 242 comprising OLTs equipped with lasers and receivers and ONUs equipped with reflective semiconductor optical amplifiers (RSOAs). In some further examples, the present disclosure further describes the method according to claim 7, further comprising abstracting the first architecture 240 into a four tier directional graph 244 with tier 1 representing queue requests, tier 2 representing lasers at ONUs, tier 3 representing wavelengths, and tier 4 representing receivers at OLTs.

In some further examples, the present disclosure further describes the method according to claim 7, wherein analyzing the abstracted graphical representation to determine the achievable rate region further comprises determining the achievable rate region based on a total rate of vertices on tier 1 of the directional graph 244. In some further examples, the present disclosure further describes the method according to claim 8, wherein a desired traffic for the WDM PON 100 is achievable if vertices representing lasers, wavelengths, and receivers satisfy: for any vertex in tiers 2, 3, and 4, a sum of rates on all incoming edges equal about a rate of the vertex; for any vertex in tiers 1, 2, and 3, the rate of the vertex is about equal to a sum of rates on all outgoing edges; and the rate of each vertex is about equal or less than one or more of a data rate of each laser, a capacity of each wavelength, and/or a receiving data rate of each receiver.

In some further examples, the present disclosure further describes the method according to claim 7, further comprising abstracting the second architecture 242 into a seven tier directional graph 246 with tier 1 representing lasers at OLTs, tier 2 representing wavelengths, tier 3 representing RSOAs at ONUs, tier 4 representing queue requests, tier 5 representing return path RSOAs at ONUs, tier 6 representing return path wavelengths, and tier 7 representing receivers at OLTs. In some further examples, the present disclosure further describes the method according to claim 11, wherein analyzing the abstracted graphical representation to determine the achievable rate region further comprises determining the achievable rate region 1124 based on one or more of a number of wavelengths associated with the WDM PON, a number of lasers associated with the WDM PON, and/or a number of receivers in the WDM PON. In some further examples, the present disclosure further describes the method according to claim 11, wherein analyzing the abstracted graphical representation to determine the achievable rate region further comprises determining the achievable rate region 1124 based on a number of RSOAs in each ONU 238.

In other examples, the present disclosure describes an apparatus 1000 for determining a capacity of a wavelength division multiplexing (WDM) passive optical network (PON), comprising: a memory 1006 configured to store instructions and also store network information data associated with the WDM PON; a processor 1004 coupled to the memory, wherein the processor is adapted to execute the instructions, which when executed configure the processor to abstract a directional graphic representing nodes and data transmission paths of the WDM PON 1122; analyze the abstracted directional graph to determine an achievable rate region of the WDM PON, wherein the achievable rate region includes a set of admissible traffic rates for the WDM PON 1124; determine a maximum achievable rate region of the WDM PON based on an optimization of one or more of full-range tunable lasers, limited-range tunable lasers, and/or specific tuning range lasers 1132.

In some further examples, the present disclosure further describes the apparatus according to claim 14, wherein the processor is further configured to enable one or more of configuration of a new WDM PON and/or reconfiguration of an existing WDM PON utilizing the optimized nodes and node relations based on the maximum achievable rate region 1134. In some further examples, the present disclosure further describes the apparatus according to claim 15, wherein the configuration of a new WDM PON and/or the reconfiguration of an existing WDM PON comprises one or more of replacement of a portion of the full-range tunable lasers with fixed-tuned lasers 576, determination of restricted tuning ranges for limited-range tunable lasers, and/or allocation of specific tuning range lasers among available optical network units (ONUs) 106, 108.

In some further examples, the present disclosure further describes he apparatus according to claim 14, wherein the processor is further adapted to determine the maximum achievable rate region 1132 based on a resource allocation scheme such that data traffic is successfully transmitted through the WDM PON at an admissible transmission rate, R, and resources of the WDM PON comprising lasers, receivers, and wavelengths are optimally utilized. In some further examples, the present disclosure further describes he apparatus according to claim 17, wherein the resource allocation scheme is determined based on "reach" relations 470 of the directional graph containing constraints on R.

In some further examples, the present disclosure further describes he apparatus according to claim 18, wherein the maximum achievable rate region is determined based on extraction of "reach" relations 470 for the entire directional graph and reducing constraint redundancies. In some further examples, the present disclosure further describes he apparatus according to claim 17, wherein the processor is further adapted to determine the resource allocation scheme based on an adjustment of wavelength ranges by an equal number of limited-range tunable lasers if R is unknown and partitioning a set of available limited-range tunable lasers through a heuristic algorithm if R is known 1128. In some further examples, the present disclosure further describes he apparatus according to claim 17, wherein the processor is further adapted to determine the resource allocation scheme based on a distribution of available specific tuning range lasers among ONUs through a matching algorithm 1130.

In yet other examples, the present disclosure describes a computer-readable storage medium having instructions stored thereon for determining a capacity of a wavelength division multiplexing (WDM) passive optical network (PON), the instructions comprising: abstracting a directional graphic representing nodes and data transmission paths of the WDM PON 1122; analyzing the abstracted directional graph to determine an achievable rate region of the WDM PON, wherein the achievable rate region includes a set of admissible traffic rates, R, for the WDM PON 1124; determining a resource allocation scheme to enable one or more of a configuration of a new WDM PON and/or a reconfiguration of an existing WDM PON 1134 for optimum WDM PON performance and reduced deployment cost based on one or more of reducing a tuning range of full-range tunable lasers without reducing R 1126; replacing a portion of the full-range tunable lasers with fixed range lasers 1126; adjusting tuning ranges of limited-range tunable lasers 1128; and/or allocating specific range lasers among available ONUs 1130.

In some further examples, the present disclosure further describes the computer-readable storage medium of claim 22, wherein the resources include one or more of lasers 122, 126, wavelengths, and/or receivers 112. In some further examples, the present disclosure further describes the computer-readable storage medium of claim 22, wherein determining the resource allocation scheme includes categorizing lasers connected to queue requests to a first set and lasers connected to wavelengths to a second set 830; and matching the lasers in the first with the lasers in the second set such that rates of the lasers in the first set are within the achievable rate region 840.

In some further examples, the present disclosure further describes the computer-readable storage medium of claim 24, wherein matching the lasers in the first with the lasers in the second set includes determining "block" relations 472 that include constraints on the achievable rate region between the lasers in the first set and the lasers in the second set; partitioning the first and the second sets into subsets 960 based on the "block" relations 472 such that traffic rates of the lasers in the first set satisfy the constraints in the "block" relations.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g. as one or more programs running on one or more microprocessors), as firmware, or as virtually any combination thereof, and that designing the circuitry and/or writing the code for the software and or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops.

A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for determining a capacity of a wavelength division multiplexing (WDM) passive optical network (PON) at a computing device managing the WDM PON, the method comprising:
    abstracting a graphical representation of the WDM PON at a processor of the computing device by determining a structure of the WDM PON, the structure including one of a first architecture comprising ONUs equipped with lasers and optical line terminals (OLTs) equipped with receivers, and a second architecture comprising OLTs equipped with lasers and receivers and ONUs equipped with reflective semiconductor optical amplifiers (RSOAs);
    analyzing the abstracted graphical representation at the processor to determine an achievable rate region of the WDM PON, wherein the achievable rate region includes a set of admissible traffic rates for the WDM PON; and
    determining a maximum achievable rate region at the processor based on optimizing nodes and node relations of the WDM PON, wherein the nodes include one or more of full-range tunable lasers, limited-range tunable lasers, and/or specific tuning range lasers.

2. The method according to claim 1, further comprising one or more of:
    configuring a new WDM PON and/or reconfiguring an existing WDM PON utilizing the optimized nodes and node relations based on the maximum achievable rate region.

3. The method according to claim 2, further comprising one or more of:
    replacing a portion of the full-range tunable lasers with fixed-tuned lasers, determining restricted tuning ranges for limited-range tunable lasers, and/or allocating specific tuning range lasers among available optical network units (ONUs).

4. The method according to claim 1, wherein abstracting the graphical representation further comprises generating a directional tiered graph with directions of connections between nodes of the graph representing directions of light signal in the WDM PON.

5. The method according to claim 1, wherein determining the maximum achievable rate region comprises one or more of: identifying a largest volume of traffic capacity for a predefined set of available nodes, determining one or more of smallest number of wavelengths, smallest number of lasers, and/or narrowest tuning ranges to be used by the optimized nodes of the WDM PON for a predefined volume of traffic.

6. The method according to claim 1, wherein analyzing the abstracted graphical representation includes analyzing one or more of the full-range tunable lasers, the limited-range tunable lasers, and/or the specific tuning range lasers.

7. The method according to claim 1, further comprising abstracting the first architecture at the processor into a four tier directional graph with tier 1 representing queue requests, tier 2 representing lasers at ONUs, tier 3 representing wavelengths, and tier 4 representing receivers at OLTs.

8. The method according to claim 7, wherein analyzing the abstracted graphical representation to determine the achievable rate region further comprises determining the achievable rate region based on a total rate of vertices on tier 1 of the directional graph.

9. The method according to claim 7, wherein a desired traffic for the WDM PON is achievable if vertices representing lasers, wavelengths, and receivers satisfy:
for any vertex in tiers 2, 3, and 4, a sum of rates on all incoming edges equal about a rate of the vertex;
for any vertex in tiers 1, 2, and 3, the rate of the vertex is about equal to a sum of rates on all outgoing edges; and
the rate of each vertex is about equal or less than one or more of a data rate of each laser, a capacity of each wavelength, and/or a receiving data rate of each receiver.

10. The method according to claim 1, further comprising abstracting the second architecture at the processor into a seven tier directional graph with tier 1 representing lasers at OLTs, tier 2 representing wavelengths, tier 3 representing RSOAs at ONUs, tier 4 representing queue requests, tier 5 representing return path RSOAs at ONUs, tier 6 representing return path wavelengths, and tier 7 representing receivers at OLTs.

11. The method according to claim 10, wherein analyzing the abstracted graphical representation to determine the achievable rate region further comprises determining the achievable rate region based on one or more of a number of wavelengths associated with the WDM PON, a number of lasers associated with the WDM PON, and/or a number of receivers in the WDM PON.

12. The method according to claim 10, wherein analyzing the abstracted graphical representation to determine the achievable rate region further comprises determining the achievable rate region based on a number of RSOAs in each ONU.

13. An apparatus for determining a capacity of a wavelength division multiplexing (WDM) passive optical network (PON), comprising:
a memory configured to store instructions and also store network information data associated with the WDM PON;
a processor coupled to the memory, wherein the processor is adapted to execute the instructions, which when executed configure the processor to:
abstract a directional graphic representing nodes and data transmission paths of the WDM PON by determining a structure of the WDM PON, the structure including one of a first architecture comprising ONUs equipped with lasers and optical line terminals (OLTs) equipped with receivers, and a second architecture comprising OLTs equipped with lasers and receivers and ONUs equipped with reflective semiconductor optical amplifiers (RSOAs);
analyze the abstracted directional graph to determine an achievable rate region of the WDM PON, wherein the achievable rate region includes a set of admissible traffic rates for the WDM PON;
determine a maximum achievable rate region of the WDM PON based on an optimization of one or more of full-range tunable lasers, limited-range tunable lasers, and/or specific tuning range lasers.

14. The apparatus according to claim 13, wherein the processor is further configured to enable one or more of configuration of a new WDM PON and/or reconfiguration of an existing WDM PON utilizing the optimized nodes and node relations based on the maximum achievable rate region.

15. The apparatus according to claim 14, wherein the configuration of a new WDM PON and/or the reconfiguration of an existing WDM PON comprises one or more of replacement of a portion of the full-range tunable lasers with fixed-tuned lasers, determination of restricted tuning ranges for limited-range tunable lasers, and/or allocation of specific tuning range lasers among available optical network units (ONUs).

16. The apparatus according to claim 13, wherein the processor is further adapted to determine the maximum achievable rate region based on a resource allocation scheme such that data traffic is successfully transmitted through the WDM PON at an admissible transmission rate, R, and resources of the WDM PON comprising lasers, receivers, and wavelengths are optimally utilized.

17. The apparatus according to claim 16, wherein the resource allocation scheme is determined based on "reach" relations of the directional graph containing constraints on R.

18. The apparatus according to claim 17, wherein the maximum achievable rate region is determined based on extraction of "reach" relations for the entire directional graph and reducing constraint redundancies.

19. The apparatus according to claim 16, wherein the processor is further adapted to determine the resource allocation scheme based on an adjustment of wavelength ranges by an equal number of limited-range tunable lasers if R is unknown and partitioning a set of available limited-range tunable lasers through a heuristic algorithm if R is known.

20. The apparatus according to claim 16, wherein the processor is further adapted to determine the resource allocation scheme based on a distribution of available specific tuning range lasers among ONUs through a matching algorithm.

21. A computer-readable storage medium having instructions stored thereon for determining a capacity of a wavelength division multiplexing (WDM) passive optical network (PON), the instructions comprising:
abstracting a directional graphic representing nodes and data transmission paths of the WDM PON by determining a structure of the WDM PON, the structure including one of a first architecture comprising ONUs equipped with lasers and optical line terminals (OLTs) equipped with receivers, and a second architecture comprising OLTs equipped with lasers and receivers and ONUs equipped with reflective semiconductor optical amplifiers (RSOAs);

analyzing the abstracted directional graph to determine an achievable rate region of the WDM PON, wherein the achievable rate region includes a set of admissible traffic rates, R, for the WDM PON;

determining a resource allocation scheme to enable one or more of a configuration of a new WDM PON and/or a reconfiguration of an existing WDM PON for optimum WDM PON performance and reduced deployment cost based on one or more of:
- reducing a tuning range of full-range tunable lasers without reducing R;
- replacing a portion of the full-range tunable lasers with fixed range lasers;
- adjusting tuning ranges of limited-range tunable lasers; and/or allocating specific range lasers among available ONUs.

22. The computer-readable storage medium of claim 21, wherein the resources include one or more of lasers, wavelengths, and/or receivers.

23. The computer-readable storage medium of claim 21, wherein determining the resource allocation scheme includes:
- categorizing lasers connected to queue requests to a first set and lasers connected to wavelengths to a second set; and
- matching the lasers in the first with the lasers in the second set such that rates of the lasers in the first set are within the achievable rate region.

24. The computer-readable storage medium of claim 23, wherein matching the lasers in the first with the lasers in the second set includes:
- determining "block" relations that include constraints on the achievable rate region between the lasers in the first set and the lasers in the second set;
- partitioning the first and the second sets into subsets based on the "block" relations such that traffic rates of the lasers in the first set satisfy the constraints in the "block" relations.

* * * * *